(12) United States Patent
Lin et al.

(10) Patent No.: US 10,698,232 B2
(45) Date of Patent: Jun. 30, 2020

(54) CONTACT LENS AND PRODUCT THEREOF

(71) Applicant: LARGAN MEDICAL CO., LTD., Taichung (TW)

(72) Inventors: En-Ping Lin, Taichung (TW); I-Wei Lai, Taichung (TW); Chun-Hung Teng, Taichung (TW)

(73) Assignee: LARGAN MEDICAL CO., LTD., Taichung (TW)

( * ) Notice: Subject to any disclaimer, the term of this patent is extended or adjusted under 35 U.S.C. 154(b) by 69 days.

(21) Appl. No.: 16/013,997

(22) Filed: Jun. 21, 2018

(65) Prior Publication Data

US 2018/0373059 A1 Dec. 27, 2018

Related U.S. Application Data

(60) Provisional application No. 62/523,815, filed on Jun. 23, 2017.

(30) Foreign Application Priority Data

Jul. 7, 2017 (TW) .............................. 106122920 A
Aug. 24, 2017 (TW) .............................. 106128791 A

(51) Int. Cl.
*G02C 7/04* (2006.01)
*G02C 7/06* (2006.01)
*G02C 7/10* (2006.01)
*G02C 7/16* (2006.01)

(52) U.S. Cl.
CPC ............. *G02C 7/044* (2013.01); *G02C 7/061* (2013.01); *G02C 7/104* (2013.01); *G02C 7/105* (2013.01); *G02C 7/108* (2013.01); *G02C 7/16* (2013.01); *G02C 2202/24* (2013.01)

(58) Field of Classification Search
CPC .......... G02C 7/04; G02C 7/041; G02C 7/042; G02C 7/043; G02C 7/044; G02C 7/045
USPC .............. 351/159.02, 159.05, 159.06, 159.1, 351/159.14, 159.24–159.32
See application file for complete search history.

(56) References Cited

U.S. PATENT DOCUMENTS

| 5,684,560 A | 11/1997 | Roffman et al. |
| 8,684,520 B2 | 4/2014 | Lindacher et al. |
| 8,789,947 B2 | 7/2014 | Collins et al. |
| 8,876,287 B2 | 11/2014 | Back et al. |
| 9,575,334 B2 | 2/2017 | Bakaraju et al. |
| 9,638,936 B2 | 5/2017 | Brennan et al. |
| 9,715,129 B2 | 7/2017 | Bowers et al. |
| 2002/0027637 A1 | 3/2002 | Jahnke |
| 2003/0156249 A1 | 8/2003 | Jahnke |

(Continued)

FOREIGN PATENT DOCUMENTS

| CN | 1165309 A | 11/1997 |
| CN | 201417349 Y | 3/2010 |

(Continued)

*Primary Examiner* — Darryl J Collins
(74) *Attorney, Agent, or Firm* — McClure, Qualey & Rodack, LLP

(57) ABSTRACT

A contact lens includes a central region, an annular region and a peripheral region. The central region includes a central point of the contact lens. The annular region symmetrically surrounds the central region. The peripheral region symmetrically surrounds the annular region. The peripheral region includes at least one color pattern portion. The annular region includes at least one power of critical point.

51 Claims, 16 Drawing Sheets

(56) References Cited

U.S. PATENT DOCUMENTS

| | | |
|---|---|---|
| 2003/0227596 A1 | 12/2003 | Clark et al. |
| 2004/0012757 A1 | 1/2004 | Hong |
| 2004/0119939 A1 | 6/2004 | Clark et al. |
| 2005/0128433 A1 | 6/2005 | Jahnke |
| 2005/0254003 A1 | 11/2005 | Jani et al. |
| 2006/0012752 A1 | 1/2006 | Chen |
| 2006/0050232 A1 | 3/2006 | Dukes et al. |
| 2006/0158610 A1 | 7/2006 | Streibig |
| 2007/0159594 A9 | 7/2007 | Jani et al. |
| 2008/0002147 A1 | 1/2008 | Haywood et al. |
| 2008/0304009 A1 | 12/2008 | Thomas et al. |
| 2011/0019149 A1 | 1/2011 | Thomas et al. |
| 2011/0069276 A1 | 3/2011 | Tucker et al. |
| 2011/0248415 A1 | 10/2011 | Alvarez-Carrigan et al. |
| 2011/0249234 A1 | 10/2011 | Duis et al. |
| 2011/0249235 A1 | 10/2011 | Duis et al. |
| 2012/0026459 A1 | 2/2012 | Tucker et al. |
| 2012/0147319 A1 | 6/2012 | Corti et al. |
| 2013/0107200 A1 | 5/2013 | Bowers et al. |
| 2013/0182215 A1 | 7/2013 | Tung |
| 2013/0278888 A1* | 10/2013 | Bakaraju ................. G02C 7/04 351/159.02 |
| 2013/0308091 A1 | 11/2013 | Wright et al. |
| 2014/0098339 A1 | 4/2014 | Duis et al. |
| 2014/0320804 A1 | 10/2014 | Corti et al. |
| 2015/0115484 A1 | 4/2015 | Duis et al. |
| 2015/0226982 A1 | 8/2015 | Tucker et al. |
| 2015/0338681 A1 | 11/2015 | Liu et al. |
| 2016/0054588 A1* | 2/2016 | Brennan ................. G02C 7/066 623/5.11 |
| 2016/0187672 A1 | 6/2016 | Tucker et al. |
| 2016/0306189 A1* | 10/2016 | Bowers ................. G02C 7/021 |
| 2016/0327809 A1 | 11/2016 | Jan et al. |
| 2016/0370504 A1 | 12/2016 | Jan et al. |
| 2017/0052390 A1 | 2/2017 | Tung |
| 2017/0066917 A1 | 3/2017 | Jan et al. |
| 2017/0075137 A1 | 3/2017 | Lin et al. |
| 2017/0075138 A1 | 3/2017 | Lin et al. |
| 2017/0184878 A1 | 6/2017 | Duis et al. |
| 2017/0248803 A1 | 8/2017 | Tucker et al. |

FOREIGN PATENT DOCUMENTS

| | | |
|---|---|---|
| CN | 103097940 A | 5/2013 |
| CN | 103926710 A | 7/2014 |
| CN | 104094164 A | 10/2014 |
| CN | 204575996 U | 8/2015 |
| CN | 105974606 A | 9/2016 |
| TW | 201621403 A | 6/2016 |
| TW | 1587034 B | 6/2017 |
| WO | 2013015743 A1 | 1/2013 |

\* cited by examiner

CONTACT LENS AND PRODUCT THEREOF

RELATED APPLICATIONS

This application claims priority to U.S. Provisional Application Ser. No. 62/523,815, filed Jun. 23, 2017, Taiwan Application Serial Number 106122920, filed Jul. 7, 2017, and Taiwan Application Serial Number 106128791, filed Aug. 24, 2017, the disclosures of which are incorporated herein by reference in their entireties.

BACKGROUND

Technical Field

The present disclosure relates to a contact lens and a product thereof. More particularly, the present disclosure relates to a contact lens and a product thereof, both of which can moderate an increase degree of a diopter away from a central region and can be applied to prevent or control myopia.

Description of Related Art

Conventionally, in the design of the defocus degree of a contact lens with vision control function, the diopter is increased rapidly once away from the central region. The change of the diopter is so drastic that the discomfort of the wearer is severe. As a result, it is difficult for the wearer to cooperate with the treatment plan for a long time, and the effect of the vision control is poor. Moreover, a conventional contact lens is featured with an identification function for observe side and reverse side by disposing small concave grooves or small protruding dots on the surface thereof. However, the small concave grooves tend to cause the break of the contact lens, and the small protruding dots tend to cause a severe foreign body sensation of the wearer. Moreover, it is difficult for the contact lens with vision control function to control the amount of the entering light rays. When the amount of the entering light rays is excessively much, it tends to cause the photophobia of the wearer. When the amount of the entering light rays is excessively less, it tends to generate an unclear image. Therefore, how to improve the structure of the contact lens for featuring the contact lens with the vision control function and preventing the aforementioned drawbacks is the goal of the relevant industry.

SUMMARY

According to one aspect of the present disclosure, a contact lens includes a central region, an annular region and a peripheral region. The central region includes a central point of the contact lens. The annular region symmetrically surrounds the central region. The peripheral region symmetrically surrounds the annular region. The peripheral region includes at least one color pattern portion, and the annular region includes at least one power of critical point. When a diopter of the central region is POWC, and a maximum diopter of the annular region is PPmax, the following conditions are satisfied:

$-0.50D \leq POWC \leq 0.50D$, and $2.00D \leq |PPmax-POWC| \leq 20.00D$.

According to another aspect of the present disclosure, a contact lens includes a central region, an annular region and a peripheral region. The central region includes a central point of the contact lens. The annular region symmetrically surrounds the central region. The peripheral region symmetrically surrounds the annular region. The peripheral region includes at least one color pattern portion, and the annular region includes at least one power of critical point. When a diopter of the central region is POWC, and a maximum diopter of the annular region is PPmax, the following condition is satisfied:

$2.00D \leq |PPmax-POWC| \leq 20.00D$.

According to yet another aspect of the present disclosure, a contact lens includes a central region, an annular region and a peripheral region. The central region includes a central point of the contact lens. The annular region symmetrically surrounds the central region. The peripheral region symmetrically surrounds the annular region. The contact lens further includes at least one light blocking ring disposed outside the central region, and the annular region includes at least one power of critical point. When a diopter of the central region is POWC, and a maximum diopter of the annular region is PPmax, the following condition is satisfied:

$2.00D \leq |PPmax-POWC| \leq 20.00D$.

According to yet another aspect of the present disclosure, a contact lens includes a central region, an annular region and a peripheral region. The central region includes a central point of the contact lens. The annular region symmetrically surrounds the central region. The peripheral region symmetrically surrounds the annular region. The annular region includes at least two powers of critical points, in order from the central point to a periphery, the two powers of critical points are a power of a first critical point and a power of a second critical point. The power of the first critical point is a high power of critical point, and the power of the second critical point is a low power of critical point. When a diopter of the central region is POWC, a maximum diopter of the annular region is PPmax, and the power of the first critical point is PCP1, the following conditions are satisfied:

$2.00D \leq |PPmax-POWC| \leq 20.00D$, and $0D < PCP1-POWC \leq 3.80D$.

According to yet another aspect of the present disclosure, a contact lens includes a central region, an annular region and a peripheral region. The central region includes a central point of the contact lens. The annular region symmetrically surrounds the central region. The peripheral region symmetrically surrounds the annular region. The annular region includes at least two powers of critical points, in order from the central point to a periphery, the two powers of critical points are a power of a first critical point and a power of a second critical point. The power of the first critical point is a high power of critical point. When a diopter of the central region is POWC, a maximum diopter of the annular region is PPmax, and the power of the first critical point is PCP1, the following conditions are satisfied:

$2.00D \leq |PPmax-POWC| \leq 20.00D$, and $4.00D \leq PCP1-POWC \leq 20.00D$.

According to yet another aspect of the present disclosure, a contact lens includes a central region, an annular region and a peripheral region. The central region includes a central point of the contact lens. The annular region symmetrically surrounds the central region. The peripheral region symmetrically surrounds the annular region. The annular region includes at least one power of critical point, and a power of critical point closest to the central point is a power of a first critical point. The power of the first critical point is a low power of critical point. When a diopter of the central region is POWC, a maximum diopter of the annular region is PPmax, and the power of the first critical point is PCP1, the following conditions are satisfied:

2.00D≤|PPmax−POWC|≤20.00ID, and

−5.00D≤PCP1−POWC<0D.

According to yet another aspect of the present disclosure, a contact lens product includes the contact lens according to any of the aforementioned aspects and an immersing solution. The contact lens is immersed in the immersing solution. At least one of the contact lens and the immersing solution includes a cycloplegic agent.

BRIEF DESCRIPTION OF THE DRAWINGS

The present disclosure can be more fully understood by reading the following detailed description of the embodiments, with reference made to the accompanying drawings as follows.

DETAILED DESCRIPTION

1st Embodiment

Figure 1:
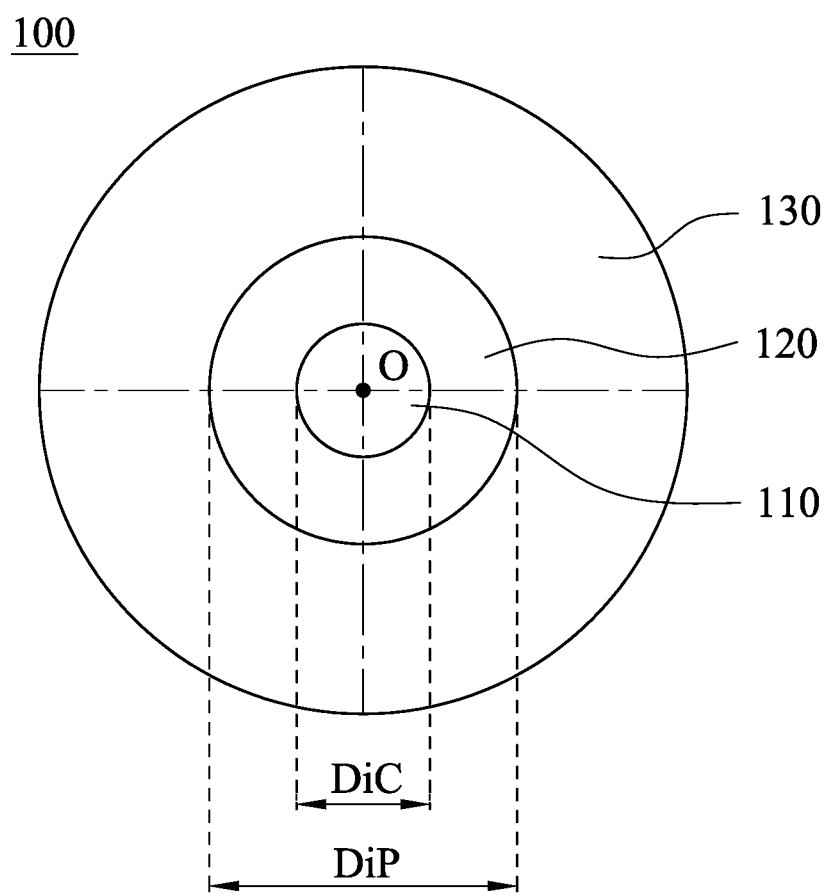
FIG. 1 is a schematic view showing regions of a contact lens according to the 1st embodiment of the present disclosure.

FIG. 1 is a schematic view showing regions of a contact lens 100 according to the 1st embodiment of the present disclosure. In FIG. 1, the contact lens 100 includes a central region 110, an annular region 120 and a peripheral region 130. The central region 110 includes a central point O of the contact lens 100. The annular region 120 symmetrically surrounds the central region 110. The peripheral region 130 symmetrically surrounds the annular region 120. The annular region 120 includes at least one power of critical point. With the power of critical point, the moderate effect of a large margin or a small margin by stage can be provided, which can effectively moderate the increase degree of the diopter away from the central region 110, and the wear comfort can be provided. Accordingly, the possibility of long term treatment can be enhanced.

When a diopter of the central region 110 is POWC, the following condition can be satisfied: −0.50 D≤POWC≤0.50 D. Therefore, when the contact lens is applied to a potential myopic patient, light rays can be well focused on the retina so as to provide a clear image. Specifically, when the diopter of the central region 110 is low or zero, and a proper and moderate defocus design of the annular region 120 is provided, the light rays can be focused in front of the retina, so that the prevention of myopia can be achieved, and the increase in axial length of the eye can be prevented. Alternatively, the following condition can be satisfied: −0.25 D≤POWC≤0.25 D.

When the diopter of the central region 110 is POWC, the following condition can be satisfied: −8.00 D≤POWC<0 D. Therefore, when the contact lens is applied to a low-moderate myopic patient, a function of correcting myopia can be provided by the diopter of the central region 110. The diopter of the central region 110 can be adjusted according to practical demands, so that the light rays can be well focused on the retina so as to provide a clear image.

Alternatively, the following condition can be satisfied: $-7.00$ D≤POWC≤$-0.25$ D. Alternatively, the following condition can be satisfied: $-6.50$ D≤POWC<0 D. Alternatively, the following condition can be satisfied: $-5.50$ D≤POWC<0 D. Alternatively, the following condition can be satisfied: $-4.50$ D≤POWC<0 D.

When the diopter of the central region 110 is POWC, and a maximum diopter of the annular region 120 is PPmax, the following condition is satisfied: 2.00 D≤|PPmax−POWC|≤20.00 D. Therefore, the annular region 120 is arranged with an increase of diopter, so that the light rays of the annular region 120 can be focused in front of the retina. With the defocus effect, the functions of preventing myopia and controlling myopia can be achieved, and the increase in axial length of the eye can be prevented. Alternatively, the following condition can be satisfied: 2.00 D≤|PPmax−POWC|≤8.00 D. Alternatively, the following condition can be satisfied: 3.50 D≤|PPmax−POWC|≤19.00 D. Alternatively, the following condition can be satisfied: 5.50 D≤|PPmax−POWC|≤17.00 D. Alternatively, the following condition can be satisfied: 8.00 D≤|PPmax−POWC|≤15.00 D. Alternatively, the following condition can be satisfied: 9.50 D≤|PPmax−POWC|≤15.50 D.

When the maximum diopter of the annular region 120 is PPmax, the following condition can be satisfied: 0 D≤PPmax≤15.00 D. Therefore, the defocus effect outside the central region 110 can be properly enhanced according to the demand of the wearer. Alternatively, the following condition can be satisfied: 0.50 D≤PPmax≤13.00 D. Alternatively, the following condition can be satisfied: 1.50 D≤PPmax≤12.50 D. Alternatively, the following condition can be satisfied: 2.00 D≤PPmax≤10.5 D. Alternatively, the following condition can be satisfied: 2.00 D≤PPmax≤9.00 D.

The annular region 120 can include at least one high power of critical point. When the high power of critical point is PPH, the following condition can be satisfied: $-5.00$ D≤PPH≤20.00. Therefore, the increase degree of the diopter can be moderated. Alternatively, the following condition can be satisfied: $-5.00$ D≤PPH≤18.00 D. Alternatively, the following condition can be satisfied: $-3.00$ D≤PPH≤16.00 D. Alternatively, the following condition can be satisfied: $-1.00$ D≤PPH≤16.00 D. Alternatively, the following condition can be satisfied: $-1.00$ D≤PPH≤14.00 D.

The annular region 120 can include at least one medium power of critical point. When the medium power of critical point is PPM, the following condition can be satisfied: $-6.00$ D≤PPM≤0 D. Therefore, a clear focus area can be provided in the periphery of the retina, and the discomfort of wearing the contact lens 100 can be eased. Alternatively, the following condition can be satisfied: $-3.00$ D≤PPM≤0 D.

The annular region 120 can include at least one low power of critical point. When the low power of critical point is PPL, the following condition can be satisfied: $-10.00$ D≤PPL≤0 D. Therefore, the design freedom for the increase of the diopter can be enhanced, and a moderate change of the diopter can be provided. Alternatively, the following condition can be satisfied: $-9.00$ D≤PPL≤0 D. Alternatively, the following condition can be satisfied: $-4.00$ D≤PPL≤0 D.

The annular region 120 can include at least one high power of critical point. When the maximum diopter of the annular region 120 is PPmax, and the high power of critical point is PPH, the following condition can be satisfied: $-5.00$≤|PPmax/PPH|60.00. Therefore, the defocus degree outside the central region 110 can be properly arranged according to the situation of the wearer. Moreover, with the high power of critical point, it is favorable for enhancing the defocus degree by stage, and the discomfort caused by the high defocus degree in the periphery can be eased. Alternatively, the following condition can be satisfied: $-5.00$≤|PPmax/PPH|≤30.00. Alternatively, the following condition can be satisfied: $-5.00$≤|PPmax/PPH|≤20.00. Alternatively, the following condition can be satisfied: $-3.00$|PPmax/PPH|≤20.00. Alternatively, the following condition can be satisfied: $-5.00$≤|PPmax/PPH|≤15.00. Alternatively, the following condition can be satisfied: $-3.00$≤|PPmax/PPH|≤18.00. Alternatively, the following condition can be satisfied: $-3.00$≤|PPmax/PPH|≤15.00. Alternatively, the following condition can be satisfied: $-3.00$≤|PPmax/PPH|≤10.00. Alternatively, the following condition can be satisfied: $-3.00$≤|PPmax/PPH|≤9.00. Alternatively, the following condition can be satisfied: $-3.00$≤|PPmax/PPH|≤5.00.

The annular region 120 can include at least one low power of critical point. When the maximum diopter of the annular region 120 is PPmax, and the low power of critical point is PPL, the following condition can be satisfied: $-40.00$≤|PPmax/PPL|≤0. Therefore, the defocus degree outside the central region 110 can be properly arranged according to the situation of the wearer. Moreover, with the low power of critical point, it is favorable for gradually moderating the defocus degree, and the design difficulty of high defocus can be reduced. Alternatively, the following condition can be satisfied: $-30.00$≤|PPmax/PPL|≤0. Alternatively, the following condition can be satisfied: $-25.00$≤|PPmax/PPL|≤0. Alternatively, the following condition can be satisfied: $-20.00$≤|PPmax/PPL|≤0. Alternatively, the following condition can be satisfied: $-15.00$≤|PPmax/PPL|≤0. Alternatively, the following condition can be satisfied: $-10.00$≤|PPmax/PPL|≤0.

When a maximum diameter of the central region 110 is DiC, the following condition can be satisfied: 1.0 mm≤DiC≤4.5 mm. Therefore, a clear central vision range can be provided according to the situation of the wearer, which is favorable for reducing the wearing discomfort. Alternatively, the following condition can be satisfied: 1.4 mm≤DiC≤4.5 mm. Alternatively, the following condition can be satisfied: 1.4 mm≤DiC≤3.5 mm. Alternatively, the following condition can be satisfied: 2.0 mm≤DiC≤3.0 mm.

When a maximum diameter of the annular region 120 is DiP, the following condition can be satisfied: DiP≤8.0 mm. Therefore, a proper range of the annular region 120 can be provided for achieving the control and the prevention of myopia.

The annular region 120 can include at least one power of critical point, and a power of critical point closest to the central point O is a power of a first critical point. The power of the first critical point can be a low power of critical point. Therefore, the diopter can be properly reduced and the change of the diopter can be moderated, so that the discomfort of the wearer caused by the defocus can be eased.

The annular region 120 can include at least two powers of critical points, in order from the central point O to a periphery (its reference numeral is omitted), the two powers of critical points are a power of a first critical point and a power of a second critical point. The power of the first critical point can be a high power of critical point. Therefore, the diopter of the inner side of the annular region 120 can be enhanced immediately, which can enhance the effect of preventing or controlling myopia.

The power of the first critical point can be a high power of critical point, and the power of the second critical point can be a low power of critical point. When the power of the first critical point is a high power of critical point, the diopter of the inner side of the annular region 120 can be enhanced immediately, which can enhance the effect of preventing or controlling myopia. Meanwhile, when the power of the second critical point is a low power of critical point, the diopter can be properly reduced and the change of the diopter can be moderated, so that the discomfort of the wearer caused by the defocus can be eased.

The power of the second critical point can be a high power of critical point. Therefore, it is favorable for enhancing the degree of defocus, and the effect of preventing or controlling myopia can be obtained in a short period.

The power of the second critical point can be a medium power of critical point. Therefore, it is favorable for moderating the degree of defocus, so that the annular region 120 has a clear focusing effect, and the vision comfort of the wearer can be increased.

The power of the second critical point can be a low power of critical point. Therefore, it is favorable for moderating the degree of defocus, and the wearing discomfort can be reduced.

When the diopter of the central region 110 is POWC, and the first power of critical point is PCP1, the following condition can be satisfied: 0 D<PCP1−POWC≤3.80 D. Therefore, the diopter difference between the first critical point and the central region 110 is proper, which is favorable for enhancing the degree of defocus by a small margin, and the effect of preventing or controlling myopia can be enhanced. Alternatively, the following condition can be satisfied: 0 D<PCP1−POWC≤3.5 D.

When the diopter of the central region 110 is POWC, and the power of first critical point is PCP1, the following condition can be satisfied: 4.00 D PCP1−POWC≤20.00 D. Therefore, the diopter difference between the first critical point and the central region 110 can be properly designed, which is favorable for properly enhancing the degree of defocus by stage, and the effect of preventing or controlling myopia can be enhanced. Alternatively, the following condition can be satisfied: 4.5 D≤PCP1−*POWC*≤18 D. Alternatively, the following condition can be satisfied: 4.5 D≤PCP1−*POWC*≤10 D.

When the diopter of the central region 110 is POWC, and the power of first critical point is PCP1, the following condition can be satisfied: −6.00 D≤PCP1−POWC≤10 D. Therefore, the diopter difference between the first critical point and the central region 110 can be properly designed, which is favorable for properly enhancing the degree of defocus by a small margin, and the effect of preventing or controlling myopia can be enhanced. Alternatively, the following condition can be satisfied: −6.00 D≤PCP1−*POWC*<0 D. Alternatively, the following condition can be satisfied: −5.00 D PCP1−POWC<0 D. Alternatively, the following condition can be satisfied: −4.00 D≤PCP1−POWC<0 D.

When the power of the first critical point is PCP1, and the power of the second critical point is PCP2, the following condition can be satisfied: −14.00 D≤PCP2−PCP1≤16 D. Therefore, the discomfort results from the design of defocus can be prevented.

When the power of the first critical point is PCP1, and the power of the second critical point is PCP2, the following condition can be satisfied: −7.00 D≤PCP2−PCP1≤0 D. Therefore, the diopter difference between the second critical point and the first critical point can be properly designed, so that the diopter can be reduced by a small margin, and the discomfort results from the design of defocus can be eased. Alternatively, the following condition can be satisfied: −6.00 D≤PCP2−PCP1≤0 D. Alternatively, the following condition can be satisfied: −5.00 D≤PCP2−PCP1≤0 D.

When the power of the first critical point is PCP1, and the power of the second critical point is PCP2, the following condition can be satisfied: −14.00 D≤PCP2−PCP1≤−7.50 D. Therefore, the diopter difference between the second critical point and the first critical point can be properly designed, so that the diopter can be reduced by a larger margin, and the discomfort results from the design of defocus can be improved quickly. Alternatively, the following condition can be satisfied: −12.00 D≤PCP2−PCP1≤−7.50 D. Alternatively, the following condition can be satisfied: −10.00 D≤PCP2−PCP1≤−7.50 D.

When the diopter of the central region 110 is POWC, the power of the first critical point is PCP1, and the power of the second critical point is PCP2, the following condition can be satisfied: −25≤(PCP2−PCP1)/(PCP1−POWC)≤0. Therefore, the discomfort can be eased, and the success rate for preventing or controlling myopia can be enhanced.

When the diopter of the central region 110 is POWC, the power of the first critical point is PCP1, and the power of the second critical point is PCP2, the following condition can be satisfied: −1.75≤(PCP2−PCP1)/(PCP1−POWC)≤0. Therefore, the ratio of the differences of the diopters can be properly designed, so that a moderate defocus design can be achieved by changing the diopter by a smaller margin, which is favorable for the long term wearing and the gradual adaption of the wearer. Accordingly, the success rate for preventing or controlling myopia can be enhanced. Alternatively, the following condition can be satisfied: −1.6≤(PCP2−PCP1)/(PCP1−POWC)≤0.

When the diopter of the central region 110 is POWC, the power of the first critical point is PCP1, and the power of the second critical point is PCP2, the following condition can be satisfied: −25 (PCP2−PCP1)/(PCP1−POWC)≤−1.9. Therefore, the ratio of the differences of the diopters can be properly designed, and a more significant defocus design can be achieved by changing the diopter by a larger margin, which is favorable for the wearer to obtain the effect of preventing or controlling myopia in a short period. Alternatively, the following condition can be satisfied: −15≤(PCP2−PCP1)/(PCP1−POWC)≤−2.

The annular region 120 can include at least three powers of critical points, in order from the central point O to the periphery, the three powers of critical points are the power of the first critical point, the power of the second critical point and a power of a third critical point. When the power of the second critical point is PCP2, and the power of the third critical point is PCP3, the following condition can be satisfied: −20.00 D≤PCP3−PCP2≤20.00 D. Therefore, the discomfort can be eased, and the effect of preventing or controlling myopia can be enhanced.

When the power of the second critical point is PCP2, and the power of the third critical point is PCP3, the following condition can be satisfied: 0 D≤PCP3−PCP2≤12.00 D. Therefore, the diopter difference between the third critical point and the second critical point can be properly designed, so that the diopter can be moderately enhanced by a small margin, and the adaption of the wearer for the treatment of preventing or controlling myopia can be enhanced.

When the power of the second critical point is PCP2, and the power of the third critical point is PCP3, the following condition can be satisfied: 14.00 D≤PCP3−PCP2≤20.00 D. Therefore, the diopter difference between the third critical point and the second critical point can be properly designed for enhancing the diopter by a larger margin, so that a more significant effect of preventing or controlling myopia can be achieved.

The power of the third critical point can be a high power of critical point. Therefore, it is favorable for enhancing the degree of defocus, and the effect of preventing or controlling myopia can be obtained in a short period.

The power of the third critical point can be a medium power of critical point. Therefore, it is favorable for moderating the degree of defocus, so that the annular region 120 has a clear focusing effect, and the vision comfort of the wearer can be increased.

The power of the third critical point can be a low power of critical point. Therefore, it is favorable for moderating the degree of defocus, and the wearing discomfort can be reduced.

The annular region 120 can include at least four powers of critical points, in order from the central point O to the periphery, the four powers of critical points are the power of the first critical point, the power of the second critical point, the power of the third critical point and a power of a fourth critical point. When the power of the third critical point is PCP3, and the power of the fourth critical point is PCP4, the following condition can be satisfied: $-15.00 \text{ D} \leq \text{PCP4}-\text{PCP3} \leq 12.00 \text{ D}$. Therefore, the diopter can be enhanced by a larger margin, and a more significant effect of preventing or controlling myopia can be achieved.

The power of the fourth critical point can be a high power of critical point. Therefore, it is favorable for enhancing the degree of defocus, and the effect of preventing or controlling myopia can be obtained in a short period.

The power of the fourth critical point can be a low power of critical point. Therefore, it is favorable for moderating the degree of defocus, and the wearing discomfort can be reduced.

The annular region 120 can include at least five powers of critical points, in order from the central point O to the periphery, the five powers of critical points are the power of the first critical point, the power of the second critical point, the power of the third critical point, the power of the fourth critical point and a power of a fifth critical point. When the power of the fourth critical point is PCP4, and the power of the fifth critical point is PCP5, the following condition can be satisfied: $-5.00 \text{ D} \leq \text{PCP5}-\text{PCP4} \leq 5.00 \text{ D}$. Therefore, the diopter can be moderately enhanced by a small margin, and the adaption of the wearer for the treatment of preventing or controlling myopia can be enhanced.

The power of the fifth critical point can be a high power of critical point. Therefore, it is favorable for enhancing the degree of defocus, and the effect of preventing or controlling myopia can be obtained in a short period.

The power of the fifth critical point can be a low power of critical point. Therefore, it is favorable for moderating the degree of defocus, and the wearing discomfort can be reduced.

The annular region 120 can include at least six powers of critical points, in order from the central point O to the periphery, the six powers of critical points are the power of the first critical point, the power of the second critical point, the power of the third critical point, the power of the fourth critical point, the power of the fifth critical point and a power of a sixth critical point. When the power of the fifth critical point is PCP5, and the power of the sixth critical point is PCP6, the following condition can be satisfied: $-5.00 \text{ D} \leq \text{PCP6}-\text{PCP5} \leq 15.00 \text{ D}$. Therefore, the diopter can be enhanced by a larger margin, and a more significant effect of preventing or controlling myopia can be achieved.

The power of the sixth critical point can be a high power of critical point. Therefore, it is favorable for enhancing the degree of defocus, and the effect of preventing or controlling myopia can be obtained in a short period.

The power of the sixth critical point can be a low power of critical point. Therefore, it is favorable for moderating the degree of defocus, and the wearing discomfort can be reduced.

The definitions of the power of critical point, the high power of critical point, the low power of critical point and the medium power of critical point are as follows. The annular region 120 of the contact lens 100 can include at least one critical point (not shown), and a diopter of the critical point is the power of critical point. According to the relationship of the power of critical point and the diopter of the central region 110, the critical points are divided into three classes: the high critical point (CH), the low critical point (CL) and the medium critical point (CM). When a critical point has a power of critical point which is higher than the diopter of the central region 110, the critical point is defined as a high critical point, and the power of critical point thereof is defined as a high power of critical point. When a critical point has a power of critical point which is lower than the diopter of the central region 110, the critical point is defined as a low critical point, and the power of critical point thereof is defined as a low power of critical point. When a critical point has a power of critical point which is equal to the diopter of the central region 110, the critical point is defined as a medium critical point, and the power of critical point thereof is defined as a medium power of critical point.

2nd Embodiment

Figure 2C:
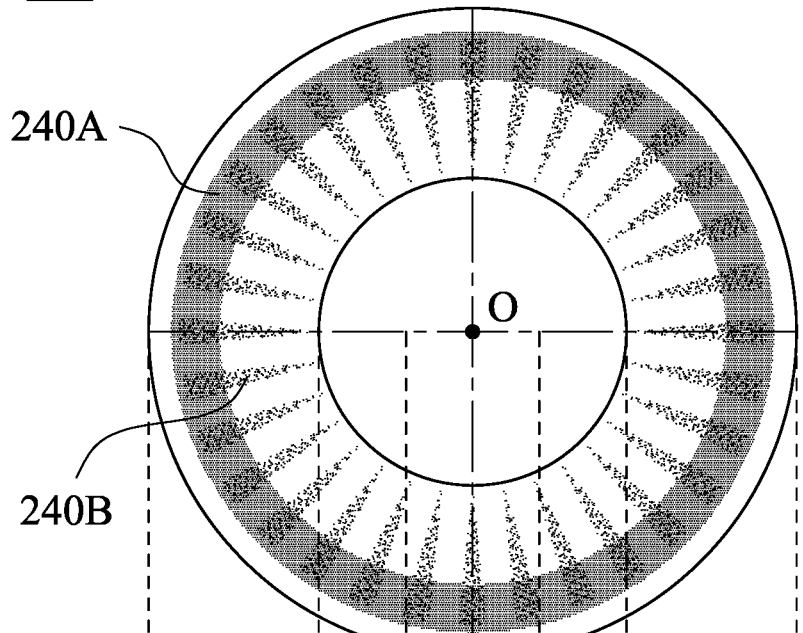
FIG. 2C is a top view of the contact lens in FIG. 2A.
Figure 2B:
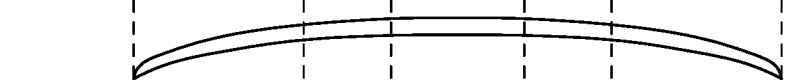
FIG. 2B is a side view of the contact lens in FIG. 2A.
Figure 2A:
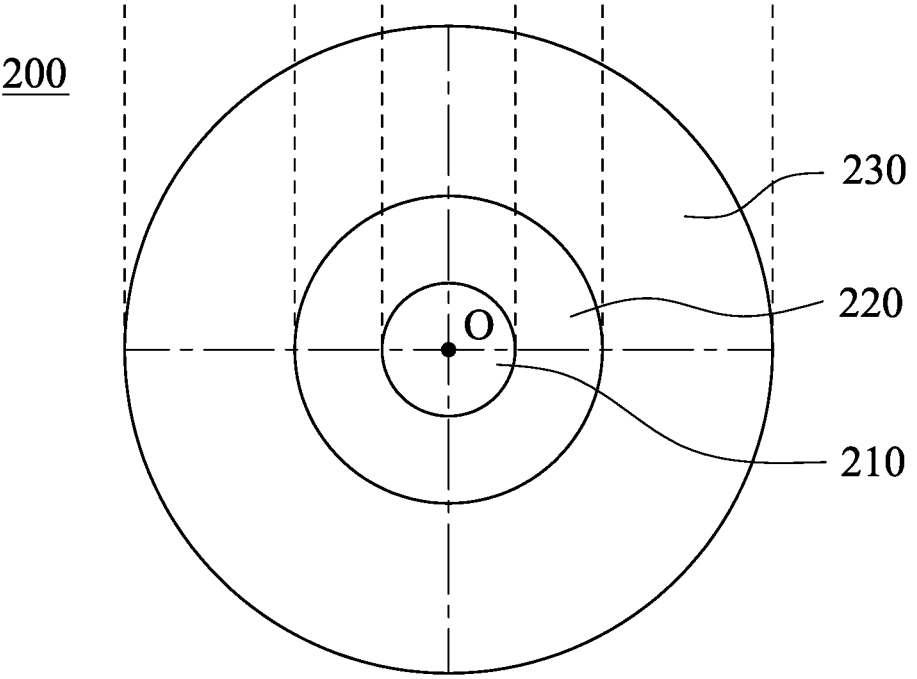
FIG. 2A is a schematic view showing regions of a contact lens according to the 2nd embodiment of the present disclosure.

FIG. 2A is a schematic view showing regions of a contact lens 200 according to the 2nd embodiment of the present disclosure. FIG. 2B is a side view of the contact lens 200 in FIG. 2A. FIG. 2C is a top view of the contact lens 200 in FIG. 2A. In FIG. 2A to FIG. 2C, the contact lens 200 includes a central region 210, an annular region 220 and a peripheral region 230. The central region 210 includes a central point O of the contact lens 200. The annular region 220 symmetrically surrounds the central region 210. The peripheral region 230 symmetrically surrounds the annular region 220. The annular region 220 includes at least one power of critical point. The peripheral region 230 can include at least one color pattern portion.

Specifically, in the 2nd embodiment, the peripheral region 230 includes two color pattern portions, which are a first color pattern portion 240A and a second color pattern portion 240B, respectively. The pattern of the first color pattern portion 240A is an annular pattern, and the pattern of the second color pattern portion 240B is a radial pattern. A color of the first color pattern portion 240A can be selected from red, orange, yellow, green, blue, indigo, purple, black, white, silver or gold, and a color of the second color pattern portion 240B is different from the color of the first color pattern portion 240A. Due to different penetration effects of visible light can be provided by different colors, the penetration ability of light (for enhancing or reducing the amount of entering light rays) can be effectively controlled by selecting a proper color. The color pattern portion with a dark color can reduce the photophobia effect, and the color pattern portion with a light color can enhance the amount of entering light rays. When the color pattern portion has a lower light transmittance, a higher light blocking effect can be provided thereby, and the vision control effect interfered by the glare and stray light can be reduced. With the dispose of the at least two color pattern portions, i.e. the first color pattern portion 240A and the second color pattern portion 240B, the effect for reducing the stray light can be selectively adjusted.

In other embodiments, the minimum inner radius of the color pattern portion can be arranged inside the annular region. That is, a partial of the annular region is covered by the color pattern portion, so that the stray light in the peripheral portion of the annular region can be blocked, which is favorable for preventing the interference of the imaging at the defocus area and easing the discomfort of the wearer.

Other details of the contact lens 200 can be the same as that of the contact lens 100 in FIG. 1, and are not repeated herein.

3rd Embodiment

Figure 3C:
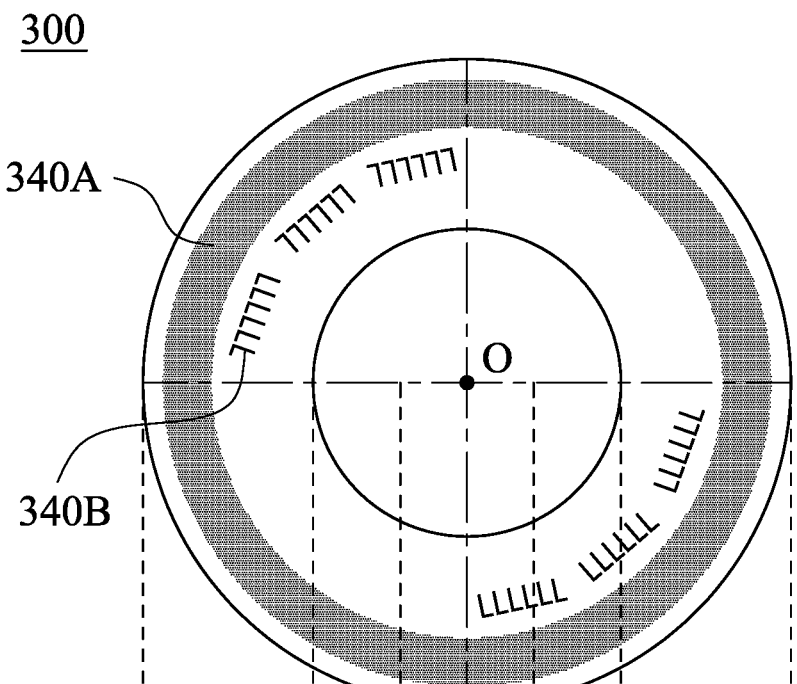
FIG. 3C is a top view of the contact lens in FIG. 3A.
Figure 3B:
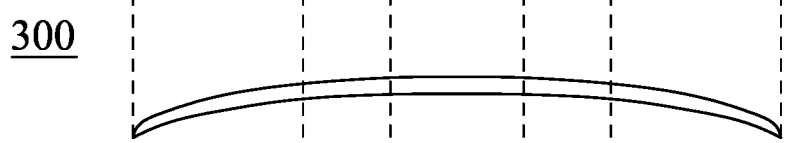
FIG. 3B is a side view of the contact lens in FIG. 3A.
Figure 3A:
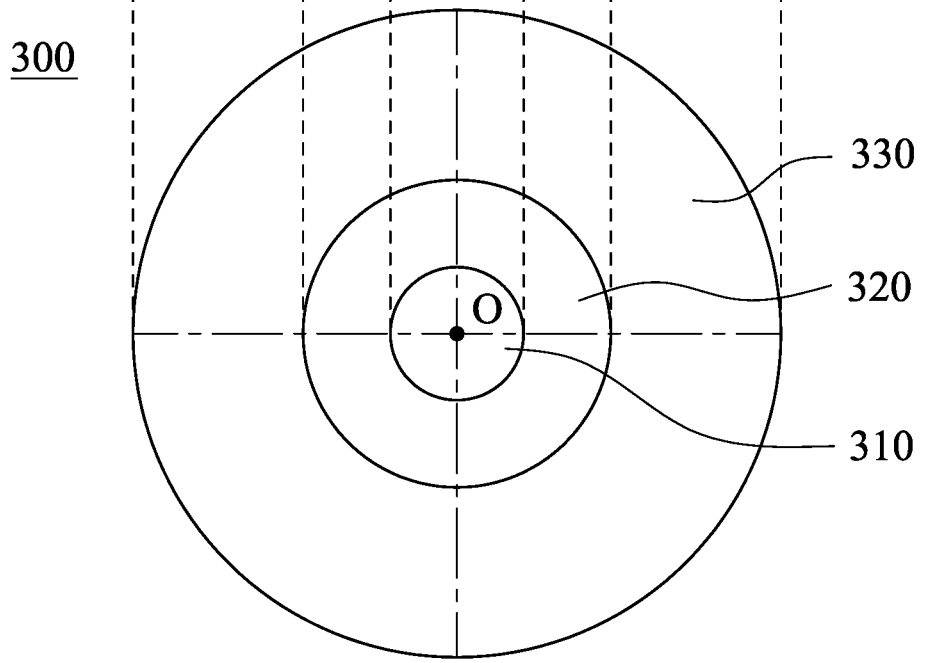
FIG. 3A is a schematic view showing regions of a contact lens according to the 3rd embodiment of the present disclosure.

FIG. 3A is a schematic view showing regions of a contact lens 300 according to the 3rd embodiment of the present disclosure. FIG. 3B is a side view of the contact lens 300 in FIG. 3A. FIG. 3C is a top view of the contact lens 300 in FIG. 3A. In FIG. 3A to FIG. 3C, the contact lens 300 includes a central region 310, an annular region 320 and a peripheral region 330. The central region 310 includes a central point O of the contact lens 300. The annular region 320 symmetrically surrounds the central region 310. The peripheral region 330 symmetrically surrounds the annular region 320. The annular region 320 includes at least one power of critical point. The peripheral region 330 can include at least one color pattern portion.

Specifically, in the 3rd embodiment, the peripheral region 330 includes two color pattern portions, which are a first color pattern portion 340A and a second color pattern portion 340B, respectively. The pattern of the first color pattern portion 340A is an annular pattern, and the pattern of the second color pattern portion 340B includes a plurality of letters of L. With the function of directional identification provided by the pattern of the second color pattern portion 340B, it is favorable for featuring the contact lens 300 with an identification function for observe side and reverse side. Accordingly, the wearing correctness can be enhanced, and the wearing convenience and efficiency can be enhanced. A color of the first color pattern portion 340A can be selected from red, orange, yellow, green, blue, indigo, purple, black, white, silver or gold, and a color of the second color pattern portion 340B is different from the color of the first color pattern portion 340A. Due to different penetration effects of visible light can be provided by different colors, the penetration ability of light (for enhancing or reducing the amount of entering light rays) can be effectively controlled by selecting a proper color. The color pattern portion with a dark color can reduce the photophobia effect, and the color pattern portion with a light color can enhance the amount of entering light rays. When the color pattern portion has a lower light transmittance, a higher light blocking effect can be provided thereby, and the vision control effect interfered by the glare and stray light can be reduced. With the dispose of the at least two color pattern portions, i.e. the first color pattern portion 340A and the second color pattern portion 340B, the effect for reducing the stray light can be selectively adjusted.

In other embodiments, the minimum inner radius of the color pattern portion can be arranged inside the annular region. That is, a partial of the annular region is covered by the color pattern portion, so that the stray light in the peripheral portion of the annular region can be blocked, which is favorable for preventing the interference of the imaging at the defocus area and easing the discomfort of the wearer.

Other details of the contact lens 300 can be the same as that of the contact lens 100 in FIG. 1, and are not repeated herein.

4th Embodiment

Figure 4:
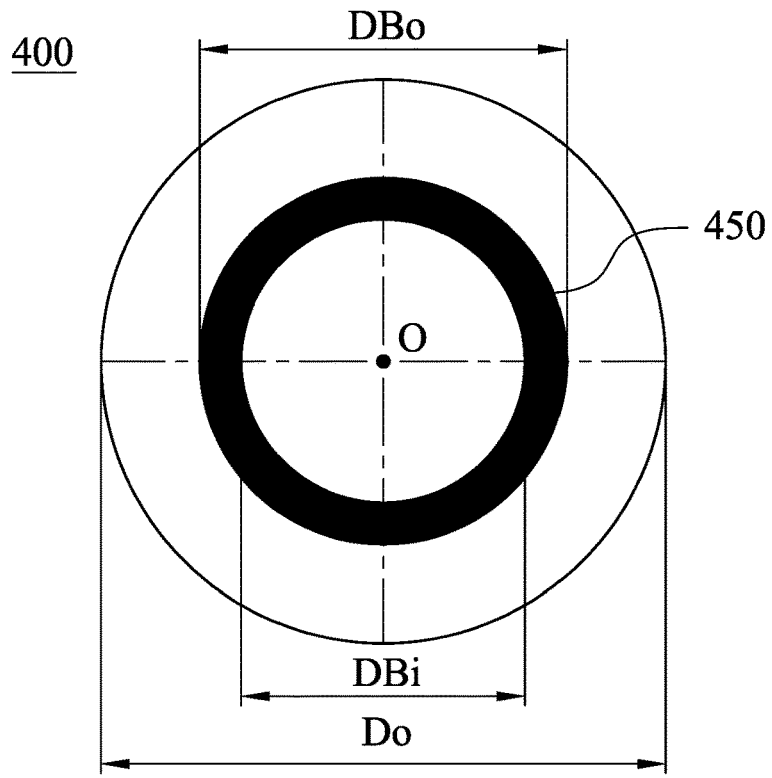
FIG. 4 is a schematic view showing a light blocking ring of a contact lens according to the 4th embodiment of the present disclosure.

FIG. 4 is a schematic view showing a light blocking ring 450 of a contact lens 400 according to the 4th embodiment of the present disclosure. In FIG. 4, the contact lens 400 includes a central region (its reference numeral is omitted), an annular region (its reference numeral is omitted) and a peripheral region (its reference numeral is omitted). The central region includes a central point O of the contact lens 400. The annular region symmetrically surrounds the central region. The peripheral region symmetrically surrounds the annular region. The annular region includes at least one power of critical point. The contact lens 400 can further include at least one light blocking ring 450 disposed outside the central region. Preferably, the light blocking ring 450 is disposed in the annular region. Therefore, the stray light in the defocus area can be effectively eliminated, and the treatment effect of controlling myopia can be enhanced. Alternatively, the peripheral region can include at least one light blocking ring 450 (i.e., the light blocking ring 450 is extended from the annular region to the peripheral region, and the peripheral region only includes a partial of the light blocking ring 450). Therefore, the photophobia caused by excessive light rays into the eye can be prevented while a sufficient amount of entering light rays can be maintained to ensure the brightness of the image.

In the 4th embodiment, the light blocking ring 450 is an evenly distributed arrangement. Therefore, the interference of the stray light can be effectively reduced, and an optimal design according to the size of the pupil of the wearer can be provided. Accordingly, the photophobia caused by excessive light rays into the eye can be prevented while a sufficient amount of entering light rays can be maintained to ensure the brightness of the image. The aforementioned "evenly distributed arrangement" refers to a design that is regular, discontinuous or fully filled. However, the present disclosure is not limited thereto.

Figure 10:
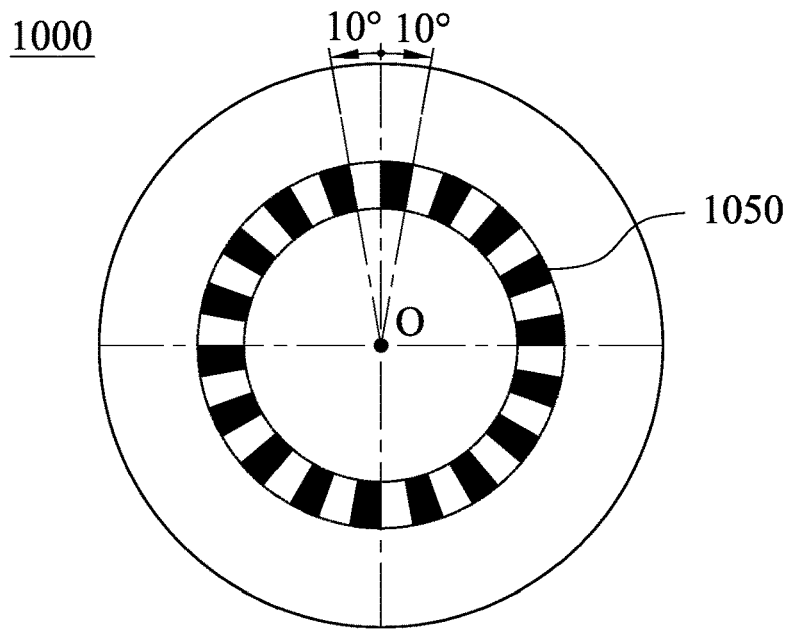
FIG. 10 is a schematic view showing a light blocking ring of a contact lens according to the 10th embodiment of the present disclosure.
Figure 11:
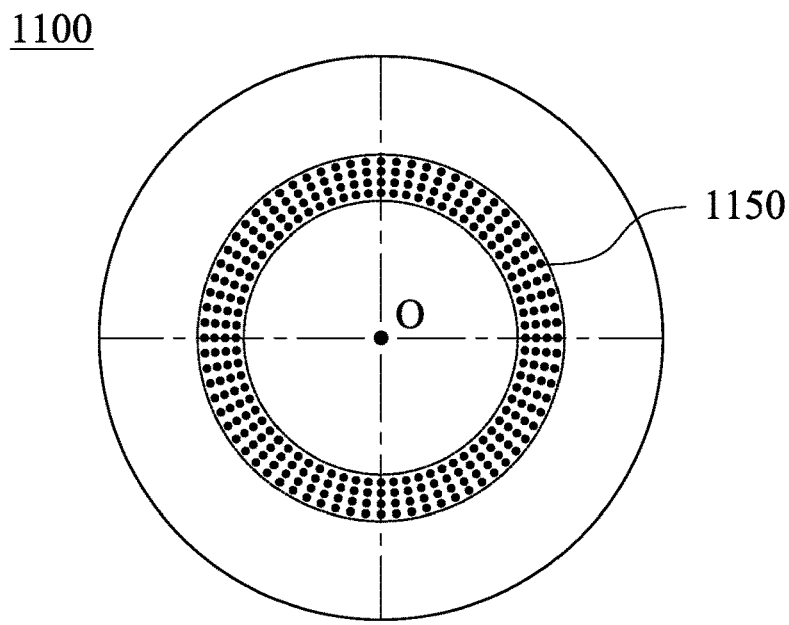
FIG. 11 is a schematic view showing a light blocking ring of a contact lens according to the 11th embodiment of the present disclosure.

In the 4th embodiment, a pattern of the light blocking ring 450 is solidly filled. However, in other embodiment, the pattern of the light blocking ring can be discontinuously filled (as shown in FIG. 10) or a dotted distribution (as shown in FIG. 11). Therefore, the photophobia caused by excessive light rays into the eye can be prevented while a sufficient amount of entering light rays can be maintained to ensure the brightness of the image.

A color of the light blocking ring 450 can be selected from red, orange, yellow, green, blue, indigo, purple, black, white, silver or gold. Therefore, the amount of entering light rays can be enhanced or reduced by selecting a proper color. The light blocking ring 450 with a dark color can reduce the photophobia effect, and the light blocking ring 450 with a light color can enhance the brightness of vision field.

In the 4th embodiment, when a minimum inner diameter of the light blocking ring 450 is DBi, the following condition can be satisfied: DBi=7.04 mm. In other embodiment, when a minimum inner diameter of a light blocking ring is DBi, the following condition can be satisfied: $3.5 \text{ mm} \leq DBi \leq 11.0$ mm. Therefore, the photophobia caused by excessive light rays into the eye can be prevented while a sufficient amount of entering light rays can be maintained to ensure the brightness of the image. Alternatively, the following condition can be satisfied: 3.5 mm DBi 10 mm. Alternatively, the following condition can be satisfied: 4.5 mm DBi 10 mm. Alternatively, the following condition can be satisfied: 4.5 mm DBi 9 mm. Alternatively, the following condition can be satisfied: 4.5 mm DBi 8.5 mm.

In the 4th embodiment, when a maximum outer diameter of the light blocking ring 450 is DBo, the following condition can be satisfied: DBo=9.1 mm. In other embodiment, when a maximum outer diameter of a light blocking ring is DBo, the following condition can be satisfied: 6 mm≤DBo≤14 mm. Therefore, the photophobia caused by excessive light rays into the eye can be prevented while a sufficient amount of entering light rays can be maintained to ensure the brightness of the image. Alternatively, the following condition can be satisfied: 6 mm≤DBo≤13 mm. Alternatively, the following condition can be satisfied: 6.5 mm≤DBo≤12.5 mm. Alternatively, the following condition can be satisfied: 6.0 mm≤DBo≤11.0 mm. Alternatively, the following condition can be satisfied: 7.5 mm≤DBo≤12.5 mm. Alternatively, the following condition can be satisfied: 8.5 mm≤DBo≤11.5 mm.

In the 4th embodiment, when a maximum outer diameter of the contact lens 400 is Do, the following condition can be satisfied: Do=14 mm. In other embodiment, when a maximum outer diameter of a contact lens is Do, the following condition can be satisfied: 13 mm≤Do≤15 mm. Therefore, the contact lens can be manufactured with a proper size according to practical demands.

In the 4th embodiment, the peripheral region of the contact lens 400 can include at least one color pattern portion (not shown). Details of the color pattern portion can be the same as that of the contact lens 200 in FIG. 2A to FIG. 2C or the contact lens 300 in FIG. 3A to FIG. 3C, and are not repeated herein. Other details of the contact lens 400 can be the same as that of the contact lens 100 in FIG. 1, and are not repeated herein.

5th Embodiment

Figure 5:
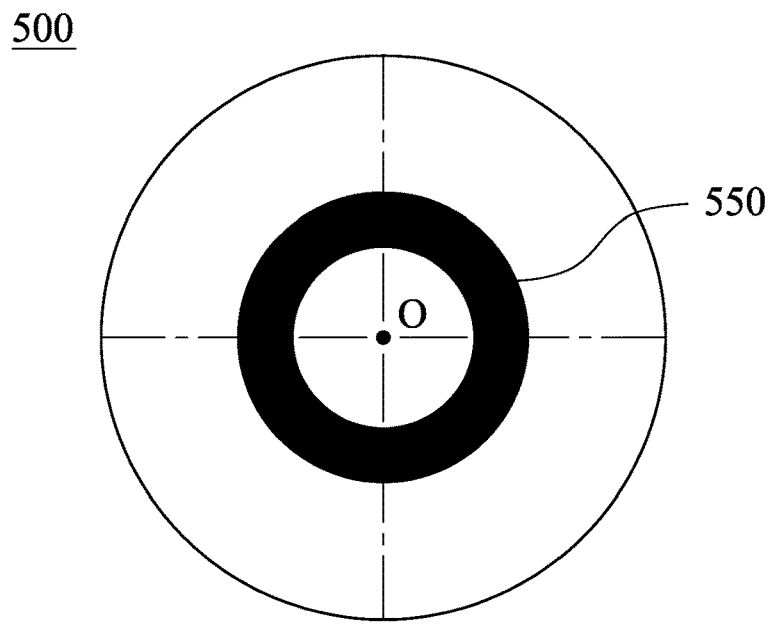
FIG. 5 is a schematic view showing a light blocking ring of a contact lens according to the 5th embodiment of the present disclosure.

FIG. 5 is a schematic view showing a light blocking ring 550 of a contact lens 500 according to the 5th embodiment of the present disclosure. In FIG. 5, the contact lens 500 includes a central region (its reference numeral is omitted), an annular region (its reference numeral is omitted) and a peripheral region (its reference numeral is omitted). The central region includes a central point O of the contact lens 500. The annular region symmetrically surrounds the central region. The peripheral region symmetrically surrounds the annular region. The annular region includes at least one power of critical point. The contact lens 500 can further include at least one light blocking ring 550 disposed outside the central region. Preferably, the light blocking ring 550 is disposed in the annular region. Alternatively, the peripheral region can include at least one light blocking ring 550 (i.e., the light blocking ring 550 is extended from the annular region to the peripheral region, and the peripheral region only includes a partial of the light blocking ring 550).

In the 5th embodiment, the light blocking ring 550 is an evenly distributed arrangement, and a pattern of the light blocking ring 550 is solidly filled. A color of the light blocking ring 550 can be selected from red, orange, yellow, green, blue, indigo, purple, black, white, silver or gold.

In the 5th embodiment, when a minimum inner diameter of the light blocking ring 550 is DBi (as shown in FIG. 4), a maximum outer diameter of the light blocking ring 550 is DBo (as shown in FIG. 4), and a maximum outer diameter of the contact lens 500 is Do, the following conditions can be satisfied:

$$DBi=4.02 \text{ mm}; DBo=7.18 \text{ mm}; \text{ and } Do=14 \text{ mm}.$$

In the 5th embodiment, the peripheral region of the contact lens 500 can further include at least one color pattern portion (not shown). Details of the color pattern portion can be the same as that of the contact lens 200 in FIG. 2A to FIG. 2C or the contact lens 300 in FIG. 3A to FIG. 3C, and are not repeated herein. Other details of the contact lens 500 can be the same as that of the contact lens 100 in FIG. 1, and are not repeated herein.

6th Embodiment

Figure 6:
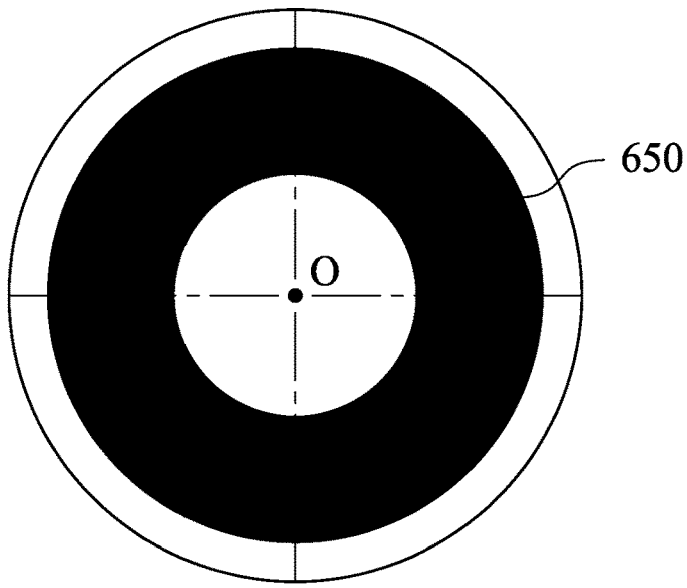
FIG. 6 is a schematic view showing a light blocking ring of a contact lens according to the 6th embodiment of the present disclosure.

FIG. 6 is a schematic view showing a light blocking ring 650 of a contact lens 600 according to the 6th embodiment of the present disclosure. In FIG. 6, the contact lens 600 includes a central region (its reference numeral is omitted), an annular region (its reference numeral is omitted) and a peripheral region (its reference numeral is omitted). The central region includes a central point O of the contact lens 600. The annular region symmetrically surrounds the central region. The peripheral region symmetrically surrounds the annular region. The annular region includes at least one power of critical point. The contact lens 600 can further include at least one light blocking ring 650 disposed outside the central region. Preferably, the light blocking ring 650 is disposed in the annular region. Alternatively, the peripheral region can include at least one light blocking ring 650 (i.e., the light blocking ring 650 is extended from the annular region to the peripheral region, and the peripheral region only includes a partial of the light blocking ring 650).

In the 6th embodiment, the light blocking ring 650 is an evenly distributed arrangement, and a pattern of the light blocking ring 650 is solidly filled. A color of the light blocking ring 650 can be selected from red, orange, yellow, green, blue, indigo, purple, black, white, silver or gold.

In the 6th embodiment, when a minimum inner diameter of the light blocking ring 650 is DBi (as shown in FIG. 4), a maximum outer diameter of the light blocking ring 650 is DBo (as shown in FIG. 4), and a maximum outer diameter of the contact lens 600 is Do, the following conditions can be satisfied:

$$DBi=5.95 \text{ mm}; DBo=12.07 \text{ mm}; \text{ and} Do=14 \text{ mm}.$$

In the 6th embodiment, the peripheral region of the contact lens 600 can further include at least one color pattern portion (not shown). Details of the color pattern portion can be the same as that of the contact lens 200 in FIG. 2A to FIG. 2C or the contact lens 300 in FIG. 3A to FIG. 3C, and are not repeated herein. Other details of the contact lens 600 can be the same as that of the contact lens 100 in FIG. 1, and are not repeated herein.

7th Embodiment

Figure 7:
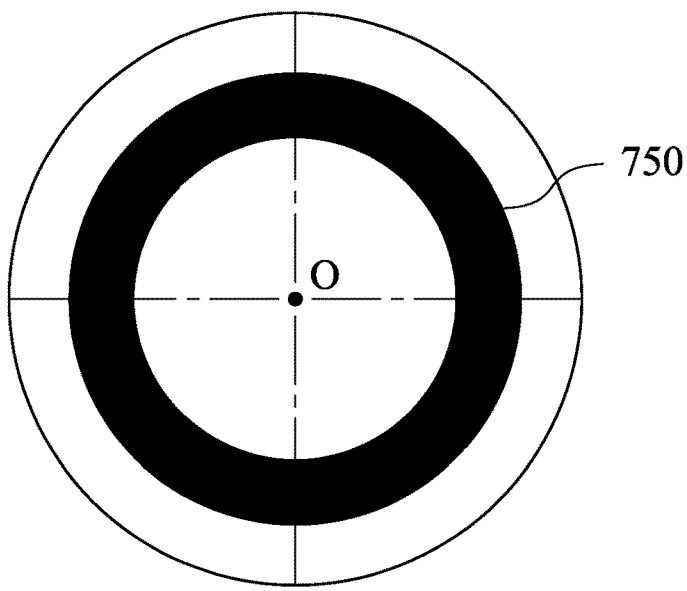
FIG. 7 is a schematic view showing a light blocking ring of a contact lens according to the 7th embodiment of the present disclosure.

FIG. 7 is a schematic view showing a light blocking ring 750 of a contact lens 700 according to the 7th embodiment of the present disclosure. In FIG. 7, the contact lens 700 includes a central region (its reference numeral is omitted), an annular region (its reference numeral is omitted) and a peripheral region (its reference numeral is omitted). The central region includes a central point O of the contact lens 700. The annular region symmetrically surrounds the central region. The peripheral region symmetrically surrounds the annular region. The annular region includes at least one power of critical point. The contact lens 700 can further include at least one light blocking ring 750 disposed outside the central region. Preferably, the light blocking ring 750 is disposed in the annular region. Alternatively, the peripheral region can include at least one light blocking ring 750 (i.e., the light blocking ring 750 is extended from the annular region to the peripheral region, and the peripheral region only includes a partial of the light blocking ring 750).

In the 7th embodiment, the light blocking ring 750 is an evenly distributed arrangement, and a pattern of the light blocking ring 750 is solidly filled. A color of the light blocking ring 750 can be selected from red, orange, yellow, green, blue, indigo, purple, black, white, silver or gold.

In the 7th embodiment, when a minimum inner diameter of the light blocking ring 750 is DBi (as shown in FIG. 4), a maximum outer diameter of the light blocking ring 750 is DBo (as shown in FIG. 4), and a maximum outer diameter of the contact lens 700 is Do, the following conditions can be satisfied:

$DBi=7.91$ mm;$DBo=11.02$ mm; and$Do=14$ mm.

In the 7th embodiment, the peripheral region of the contact lens 700 can further include at least one color pattern portion (not shown). Details of the color pattern portion can be the same as that of the contact lens 200 in FIG. 2A to FIG. 2C or the contact lens 300 in FIG. 3A to FIG. 3C, and are not repeated herein. Other details of the contact lens 700 can be the same as that of the contact lens 100 in FIG. 1, and are not repeated herein.

8th Embodiment

Figure 8:
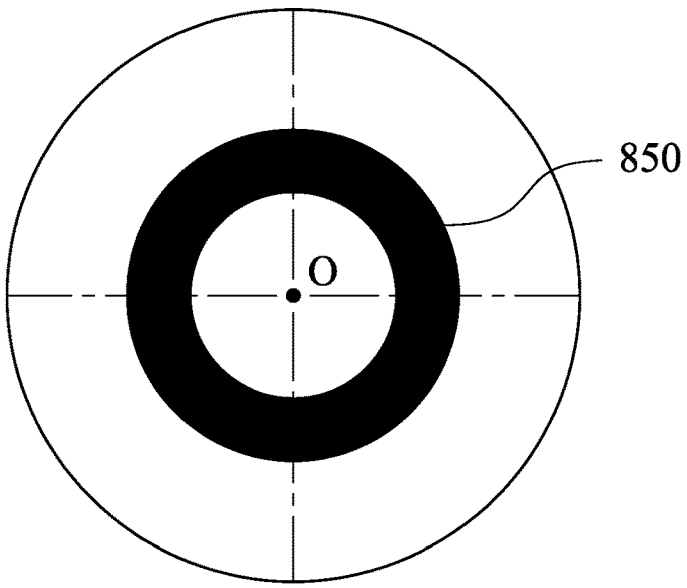
FIG. 8 is a schematic view showing a light blocking ring of a contact lens according to the 8th embodiment of the present disclosure.

FIG. 8 is a schematic view showing a light blocking ring 850 of a contact lens 800 according to the 8th embodiment of the present disclosure. In FIG. 8, the contact lens 800 includes a central region (its reference numeral is omitted), an annular region (its reference numeral is omitted) and a peripheral region (its reference numeral is omitted). The central region includes a central point O of the contact lens 800. The annular region symmetrically surrounds the central region. The peripheral region symmetrically surrounds the annular region. The annular region includes at least one power of critical point. The contact lens 800 can further include at least one light blocking ring 850 disposed outside the central region. Preferably, the light blocking ring 850 is disposed in the annular region. Alternatively, the peripheral region can include at least one light blocking ring 850 (i.e., the light blocking ring 850 is extended from the annular region to the peripheral region, and the peripheral region only includes a partial of the light blocking ring 850).

In the 8th embodiment, the light blocking ring 850 is an evenly distributed arrangement, and a pattern of the light blocking ring 850 is solidly filled. A color of the light blocking ring 850 can be selected from red, orange, yellow, green, blue, indigo, purple, black, white, silver or gold.

In the 8th embodiment, when a minimum inner diameter of the light blocking ring 850 is DBi (as shown in FIG. 4), a maximum outer diameter of the light blocking ring 850 is DBo (as shown in FIG. 4), and a maximum outer diameter of the contact lens 800 is Do, the following conditions can be satisfied:

$DBi=5.03$ mm;$DBo=8.1$ mm; and$Do=14$ mm.

In the 8th embodiment, the peripheral region of the contact lens 800 can further include at least one color pattern portion (not shown). Details of the color pattern portion can be the same as that of the contact lens 200 in FIG. 2A to FIG. 2C or the contact lens 300 in FIG. 3A to FIG. 3C, and are not repeated herein. Other details of the contact lens 800 can be the same as that of the contact lens 100 in FIG. 1, and are not repeated herein.

9th Embodiment

Figure 9:
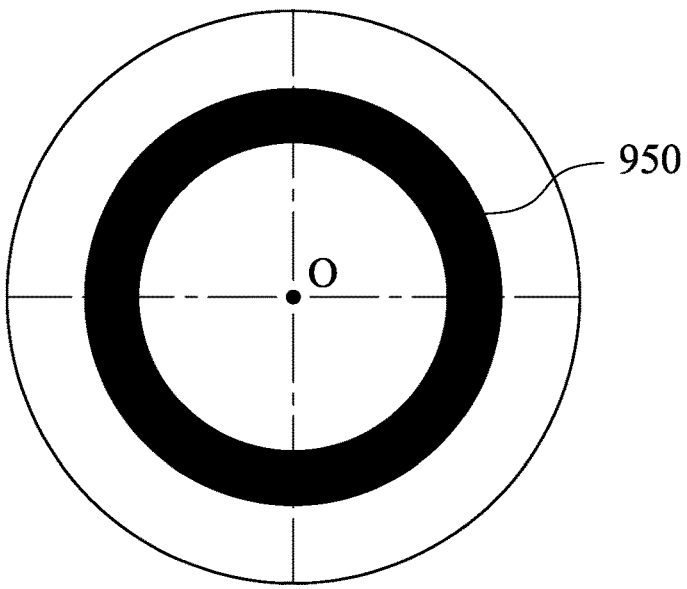
FIG. 9 is a schematic view showing a light blocking ring of a contact lens according to the 9th embodiment of the present disclosure.

FIG. 9 is a schematic view showing a light blocking ring 950 of a contact lens 900 according to the 9th embodiment of the present disclosure. In FIG. 9, the contact lens 900 includes a central region (its reference numeral is omitted), an annular region (its reference numeral is omitted) and a peripheral region (its reference numeral is omitted). The central region includes a central point O of the contact lens 900. The annular region symmetrically surrounds the central region. The peripheral region symmetrically surrounds the annular region. The annular region includes at least one power of critical point. The contact lens 900 can further include at least one light blocking ring 950 disposed outside the central region. Preferably, the light blocking ring 950 is disposed in the annular region. Alternatively, the peripheral region can include at least one light blocking ring 950 (i.e., the light blocking ring 950 is extended from the annular region to the peripheral region, and the peripheral region only includes a partial of the light blocking ring 950).

In the 9th embodiment, the light blocking ring 950 is an evenly distributed arrangement, and a pattern of the light blocking ring 950 is solidly filled. A color of the light blocking ring 950 can be selected from red, orange, yellow, green, blue, indigo, purple, black, white, silver or gold.

In the 9th embodiment, when a minimum inner diameter of the light blocking ring 950 is DBi (as shown in FIG. 4), a maximum outer diameter of the light blocking ring 950 is DBo (as shown in FIG. 4), and a maximum outer diameter of the contact lens 900 is Do, the following conditions can be satisfied:

$DBi=7.58$ mm;$DBo=10.15$ mm; and$Do=14$ mm.

In the 9th embodiment, the peripheral region of the contact lens 900 can further include at least one color pattern portion (not shown). Details of the color pattern portion can be the same as that of the contact lens 200 in FIG. 2A to FIG. 2C or the contact lens 300 in FIG. 3A to FIG. 3C, and are not repeated herein. Other details of the contact lens 900 can be the same as that of the contact lens 100 in FIG. 1, and are not repeated herein.

10th Embodiment

FIG. 10 is a schematic view showing a light blocking ring 1050 of a contact lens 1000 according to the 10th embodiment of the present disclosure. In FIG. 10, the contact lens 1000 includes a central region (its reference numeral is omitted), an annular region (its reference numeral is omitted) and a peripheral region (its reference numeral is omitted). The central region includes a central point O of the contact lens 1000. The annular region symmetrically surrounds the central region. The peripheral region symmetrically surrounds the annular region. The annular region includes at least one power of critical point. The contact lens 1000 can further include at least one light blocking ring 1050 disposed outside the central region. Preferably, the light blocking ring 1050 is disposed in the annular region. Alternatively, the peripheral region can include at least one light blocking ring 1050 (i.e., the light blocking ring 1050 is extended from the annular region to the peripheral region, and the peripheral region only includes a partial of the light blocking ring 1050).

In the 10th embodiment, the light blocking ring 1050 is an evenly distributed arrangement, and a pattern of the light blocking ring 1050 is discontinuously filled. A color of the light blocking ring 1050 can be selected from red, orange, yellow, green, blue, indigo, purple, black, white, silver or gold.

In the 10th embodiment, when a minimum inner diameter of the light blocking ring 1050 is DBi (as shown in FIG. 4), a maximum outer diameter of the light blocking ring 1050 is DBo (as shown in FIG. 4), and a maximum outer diameter of the contact lens 1000 is Do, the following conditions can be satisfied: DBi=6.79 mm; DBo=9.1 mm; and Do=14 mm.

In the 10th embodiment, the peripheral region of the contact lens 1000 can further include at least one color pattern portion (not shown). Details of the color pattern portion can be the same as that of the contact lens 200 in FIG. 2A to FIG. 2C or the contact lens 300 in FIG. 3A to FIG. 3C, and are not repeated herein. Other details of the contact lens 1000 can be the same as that of the contact lens 100 in FIG. 1, and are not repeated herein.

11th Embodiment

FIG. 11 is a schematic view showing a light blocking ring 1150 of a contact lens 1100 according to the 11th embodiment of the present disclosure. In FIG. 11, the contact lens 1100 includes a central region (its reference numeral is omitted), an annular region (its reference numeral is omitted) and a peripheral region (its reference numeral is omitted). The central region includes a central point O of the contact lens 1100. The annular region symmetrically surrounds the central region. The peripheral region symmetrically surrounds the annular region. The annular region includes at least one power of critical point. The contact lens 1100 can further include at least one light blocking ring 1150 disposed outside the central region. Preferably, the light blocking ring 1150 is disposed in the annular region. Alternatively, the peripheral region can include at least one light blocking ring 1150 (i.e., the light blocking ring 1150 is extended from the annular region to the peripheral region, and the peripheral region only includes a partial of the light blocking ring 1150).

In the 11th embodiment, the light blocking ring 1150 is an evenly distributed arrangement, and the light blocking ring 1150 is a dotted distribution. A color of the light blocking ring 1150 can be selected from red, orange, yellow, green, blue, indigo, purple, black, white, silver or gold.

In the 11th embodiment, when a minimum inner diameter of the light blocking ring 1150 is DBi (as shown in FIG. 4), a maximum outer diameter of the light blocking ring 1150 is DBo (as shown in FIG. 4), and a maximum outer diameter of the contact lens 1100 is Do, the following conditions can be satisfied: DBi=6.8 mm; DBo=9.1 mm; and Do=14 mm.

In the 11th embodiment, the peripheral region of the contact lens 1100 can further include at least one color pattern portion (not shown). Details of the color pattern portion can be the same as that of the contact lens 200 in FIG. 2A to FIG. 2C or the contact lens 300 in FIG. 3A to FIG. 3C, and are not repeated herein. Other details of the contact lens 1100 can be the same as that of the contact lens 100 in FIG. 1, and are not repeated herein.

Each of the aforementioned features of the contact lens can be utilized in numerous combinations, so as to achieve the corresponding functionality.

12th Embodiment

Figure 27:
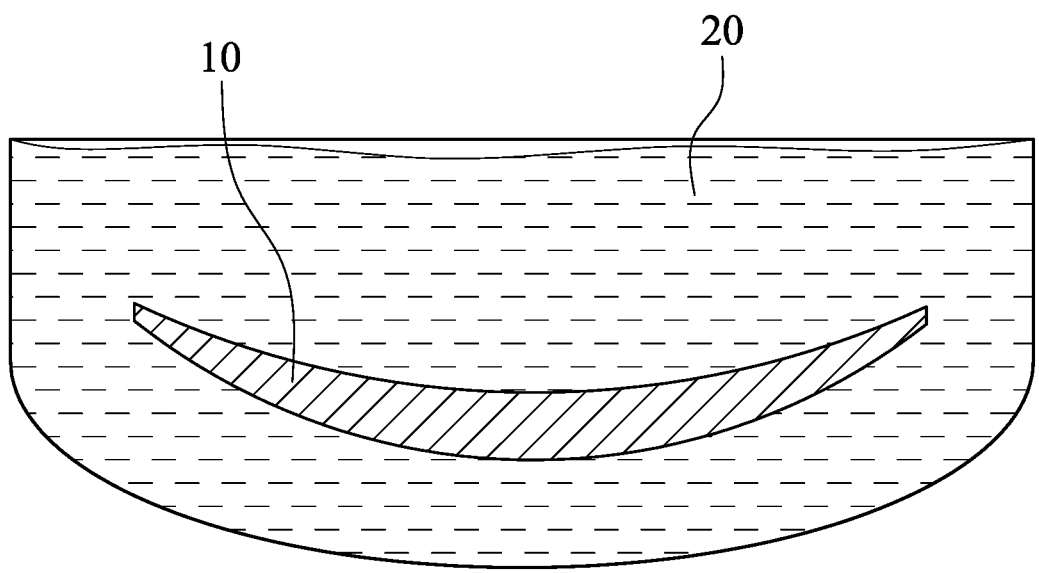
FIG. 27 is a schematic view showing a contact lens product according to the 12th embodiment of the present disclosure.

FIG. 27 is a schematic view showing a contact lens product 30 according to the 12th embodiment of the present disclosure. In FIG. 27, the contact lens product 30 includes a contact lens 10 and an immersing solution 20. The contact lens 10 is immersed in the immersing solution 20. Details of the contact lens 10 can be the same as that of the contact lens 100 in FIG. 1 to the contact lens 1100 in FIG. 11, and are not repeated herein. The immersing solution 20 can be a commercially available solution for immersing and preserving contact lenses.

At least one of the contact lens 10 and the immersing solution 20 can include a cycloplegic agent. That is, only the contact lens 10 include the cycloplegic agent, only the immersing solution 20 include the cycloplegic agent, or both of the contact lens 10 and the immersing solution 20 include the cycloplegic agent.

Specifically, the composition for manufacturing the contact lens 10 can be added with the cycloplegic agent, so that the contact lens 10 manufactured thereby can include the cycloplegic agent. Therefore, the cycloplegic agent can be slowly released when the contact lens 10 is worn, which is favorable for deterring myopia. Moreover, the function of controlling vision can be provided by simply wearing the contact lens 10, which can simplify the treatment procedure. Alternatively, the cycloplegic agent can be added into the commercially available solution for immersing and preserving contact lenses, so that the immersing solution 20 can include the cycloplegic agent. Therefore, an effect of the cycloplegic agent can be provided when the contact lens 10 is worn, which is favorable for providing an immediate effect and simplifying the treatment procedure. When a weight percentage concentration of the cycloplegic agent in the contact lens 10 or the immersing solution 20 is ConA, the following condition can be satisfied: $0\% < \text{ConA} \leq 1\%$. Alternatively, the following condition can be satisfied: $0\% < \text{ConA} \leq 0.5\%$. Alternatively, the following condition can be satisfied: $0\% < \text{ConA} \leq 0.25\%$. Alternatively, the following condition can be satisfied: $0\% < \text{ConA} \leq 0.1\%$. Alternatively, the following condition can be satisfied: $0\% < \text{ConA} \leq 0.05\%$. Alternatively, the following condition can be satisfied: $0\% < \text{ConA} \leq 0.01\%$.

According to the above description of the present disclosure, the following specific examples are provided for further explanation.

1st Example

In the 1st example, the contact lens includes a central region, an annular region and a peripheral region. The central region includes a central point of the contact lens. The annular region symmetrically surrounds the central region. The peripheral region symmetrically surrounds the annular region. The peripheral region can include at least one color pattern portion. At least one light blocking ring can be disposed outside the central region. The structure of the contact lens of the 1st example can refer to FIG. 1. The color pattern portion can refer to FIG. 2A to FIG. 3C. The light blocking ring can refer to FIG. 4 to FIG. 11. The contact lens of the 1st example can include a cycloplegic agent according to practical demands.

Figure 12:
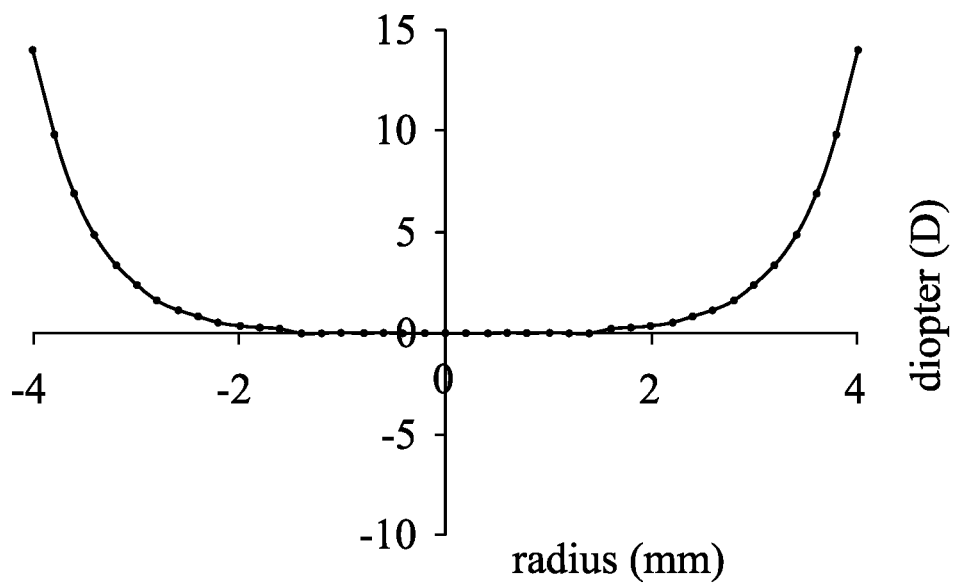
FIG. 12 shows a relationship between a radius and a diopter of a contact lens of the 1st example.

Please refer to Table 1 and FIG. 12 simultaneously. The radius and the correspondent diopter of the contact lens of the 1st example are listed in Table 1. FIG. 12 shows a relationship between the radius and the diopter of the contact lens of the 1st example (the negative radius has an opposite direction with the positive radius).

TABLE 1

| 1st example | |
| --- | --- |
| radius (mm) | diopter (D) |
| −4.0 | 14.00 |
| −3.8 | 9.83 |
| −3.6 | 6.90 |
| −3.4 | 4.84 |
| −3.2 | 3.40 |
| −3.0 | 2.38 |
| −2.8 | 1.67 |
| −2.6 | 1.17 |
| −2.4 | 0.82 |
| −2.2 | 0.58 |
| −2.0 | 0.41 |
| −1.8 | 0.28 |
| −1.6 | 0.20 |
| −1.4 | 0 |
| −1.2 | 0 |
| −1.0 | 0 |
| −0.8 | 0 |
| −0.6 | 0 |
| −0.4 | 0 |
| −0.2 | 0 |
| 0.0 | 0 |
| 0.2 | 0 |
| 0.4 | 0 |
| 0.6 | 0 |
| 0.8 | 0 |
| 1.0 | 0 |
| 1.2 | 0 |
| 1.4 | 0 |
| 1.6 | 0.20 |
| 1.8 | 0.28 |
| 2.0 | 0.41 |
| 2.2 | 0.58 |
| 2.4 | 0.82 |
| 2.6 | 1.17 |
| 2.8 | 1.67 |
| 3.0 | 2.38 |
| 3.2 | 3.40 |
| 3.4 | 4.84 |
| 3.6 | 6.90 |
| 3.8 | 9.83 |
| 4.0 | 14.00 |

Note:
the region with an absolute value of the radius smaller than or equal to 1.4 mm is the central region, and the region with the absolute value of the radius greater than 1.4 mm is the annular region.

In the contact lens according to the 1st example, a diopter of the central region is POWC, a maximum diopter of the annular region is PPmax, a maximum diameter of the central region is DiC, a maximum diameter of the annular region is DiP, a high power of critical point of the annular region is PPH, a medium power of critical point of the annular region is PPM, a low power of critical point of the annular region is PPL, a power of a first critical point is PCP1, a power of a second critical point is PCP2, a power of a third critical point is PCP3, a power of a fourth critical point is PCP4, a power of a fifth critical point is PCP5, and a power of a sixth critical point is PCP6. The values of the aforementioned parameters of the 1st example and the values of relevant conditions thereof are listed in Table 2.

TABLE 2

| 1st example | |
| --- | --- |
| PowC (D) | 0.00 |
| PPmax (D | 14.00 |
| \|PPmax − POWC\| (D) | 14.00 |
| DiC (mm) | 2.8 |
| DiP (mm) | 8.0 |
| PPH (D) | — |
| PPM (D) | — |
| PPL (D) | — |
| \|PPmax/PPH\| | — |
| \|PPmax/PPL\| | — |
| PCP1 (D) | — |
| PCP2 (D) | — |
| PCP3 (D) | — |
| PCP4 (D) | — |
| PCP5 (D) | — |
| PCP6 (D) | — |
| PCP1 − POWC (D) | — |
| PCP2 − PCP1 (D) | — |
| PCP3 − PCP2 (D) | — |
| PCP4 − PCP3 (D) | — |
| PCP5 − PCP4 (D) | — |
| PCP6 − PCP5 (D) | — |
| (PCP2 − PCP1)/(PCP1 − POWC) | — |

2nd Example

In the 2nd example, the contact lens includes a central region, an annular region and a peripheral region. The central region includes a central point of the contact lens. The annular region symmetrically surrounds the central region. The peripheral region symmetrically surrounds the annular region. The peripheral region can include at least one color pattern portion. At least one light blocking ring can be disposed outside the central region. The structure of the contact lens of the 2nd example can refer to FIG. 1. The color pattern portion can refer to FIG. 2A to FIG. 3C. The light blocking ring can refer to FIG. 4 to FIG. 11. The annular region includes a high critical point. The contact lens of the 2nd example can include a cycloplegic agent according to practical demands.

Figure 13:
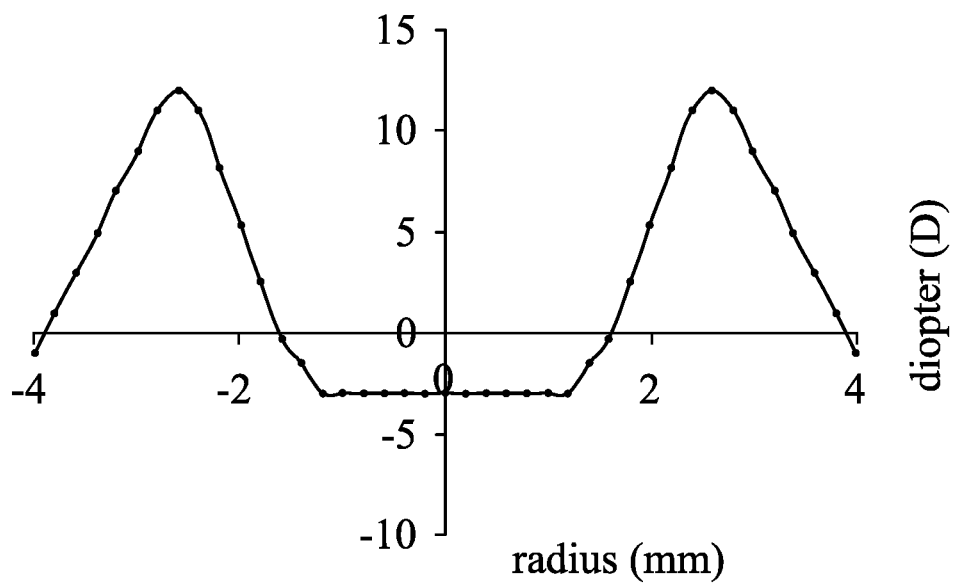
FIG. 13 shows a relationship between a radius and a diopter of a contact lens of the 2nd example.

Please refer to Table 3 and FIG. 13 simultaneously. The radius and the correspondent diopter of the contact lens of the 2nd example are listed in Table 3. FIG. 13 shows a relationship between the radius and the diopter of the contact lens of the 2nd example (the negative radius has an opposite direction with the positive radius).

TABLE 3

| 2nd example | |
| --- | --- |
| radius (mm) | diopter (D) |
| −4.0 | −1.00 |
| −3.8 | 1.00 |
| −3.6 | 3.00 |
| −3.4 | 5.00 |
| −3.2 | 7.00 |
| −3.0 | 9.00 |
| −2.8 | 11.00 |
| −2.6 | 12.00 |
| −2.4 | 11.00 |
| −2.2 | 8.19 |
| −2.0 | 5.38 |
| −1.8 | 2.56 |
| −1.6 | −0.25 |
| −1.4 | −1.50 |
| −1.2 | −3.00 |
| −1.0 | −3.00 |
| −0.8 | −3.00 |

TABLE 3-continued

2nd example

| radius (mm) | diopter (D) |
|---|---|
| −0.6 | −3.00 |
| −0.4 | −3.00 |
| −0.2 | −3.00 |
| 0.0 | −3.00 |
| 0.2 | −3.00 |
| 0.4 | −3.00 |
| 0.6 | −3.00 |
| 0.8 | −3.00 |
| 1.0 | −3.00 |
| 1.2 | −3.00 |
| 1.4 | −1.50 |
| 1.6 | −0.25 |
| 1.8 | 2.56 |
| 2.0 | 5.38 |
| 2.2 | 8.19 |
| 2.4 | 11.00 |
| 2.6 | 12.00 |
| 2.8 | 11.00 |
| 3.0 | 9.00 |
| 3.2 | 7.00 |
| 3.4 | 5.00 |
| 3.6 | 3.00 |
| 3.8 | 1.00 |
| 4.0 | −1.00 |

Note:
the region with an absolute value of the radius smaller than or equal to 1.2 mm is the central region, and the region with the absolute value of the radius greater than 1.2 mm is the annular region.

Note:
the annular region includes, in order from the central point to a periphery, a high power of critical point of 12.00 D.

In the contact lens according to the 2nd example, the values of the parameters of POWC, PPmax, DiC, DiP, PPH, PPM, PPL, PCP1, PCP2, PCP3, PCP4, PCP5 and PCP6 and the values of relevant conditions thereof are listed in Table 4, and definitions of the aforementioned parameters can refer to the 1st example.

TABLE 4

2nd example

| PowC (D) | −3.00 |
|---|---|
| PPmax (D | 12.00 |
| |PPmax − POWC| (D) | 15.00 |
| DiC (mm) | 2.4 |
| DiP (mm) | 8.0 |
| PPH (D) | 12.00 |
| PPM (D) | — |
| PPL (D) | — |
| |PPmax/PPH| | 1.00 |
| |PPmax/PPL| | — |
| PCP1 (D) | 12.00 |
| PCP2 (D) | — |
| PCP3 (D) | — |
| PCP4 (D) | — |
| PCP5 (D) | — |
| PCP6 (D) | — |
| PCP1 − POWC (D) | 15.00 |
| PCP2 − PCP1 (D) | — |
| PCP3 − PCP2 (D) | — |
| PCP4 − PCP3 (D) | — |
| PCP5 − PCP4 (D) | — |
| PCP6 − PCP5 (D) | — |
| (PCP2 − PCP1)/(PCP1 − POWC) | — |

In the contact lens according to the 2nd example, a first critical point is CP1, a second critical point is CP2, a third critical point is CP3, a fourth critical point is CP4, a fifth critical point is CP5, and a sixth critical point is CP6. The classes of the aforementioned critical points of the 2nd example are listed in Table 5.

TABLE 5

2nd example

| CP1 | CH |
|---|---|
| CP2 | — |
| CP3 | — |
| CP4 | — |
| CP5 | — |
| CP6 | — |

3rd Example

In the 3rd example, the contact lens includes a central region, an annular region and a peripheral region. The central region includes a central point of the contact lens. The annular region symmetrically surrounds the central region. The peripheral region symmetrically surrounds the annular region. The peripheral region can include at least one color pattern portion. At least one light blocking ring can be disposed outside the central region. The structure of the contact lens of the 3rd example can refer to FIG. 1. The color pattern portion can refer to FIG. 2A to FIG. 3C. The light blocking ring can refer to FIG. 4 to FIG. 11. The annular region includes a low critical point. The contact lens of the 3rd example can include a cycloplegic agent according to practical demands.

4th Example

In the 4th example, the contact lens includes a central region, an annular region and a peripheral region. The central region includes a central point of the contact lens. The annular region symmetrically surrounds the central region. The peripheral region symmetrically surrounds the annular region. The peripheral region can include at least one color pattern portion. At least one light blocking ring can be disposed outside the central region. The structure of the contact lens of the 4th example can refer to FIG. 1. The color pattern portion can refer to FIG. 2A to FIG. 3C. The light blocking ring can refer to FIG. 4 to FIG. 11. The annular region includes a high critical point and a low critical point. The contact lens of the 4th example can include a cycloplegic agent according to practical demands.

5th Example

In the 5th example, the contact lens includes a central region, an annular region and a peripheral region. The central region includes a central point of the contact lens. The annular region symmetrically surrounds the central region. The peripheral region symmetrically surrounds the annular region. The peripheral region can include at least one color pattern portion. At least one light blocking ring can be disposed outside the central region. The structure of the contact lens of the 5th example can refer to FIG. 1. The color pattern portion can refer to FIG. 2A to FIG. 3C. The light blocking ring can refer to FIG. 4 to FIG. 11. The annular region includes two high critical points. The contact lens of the 5th example can include a cycloplegic agent according to practical demands.

Figure 14:
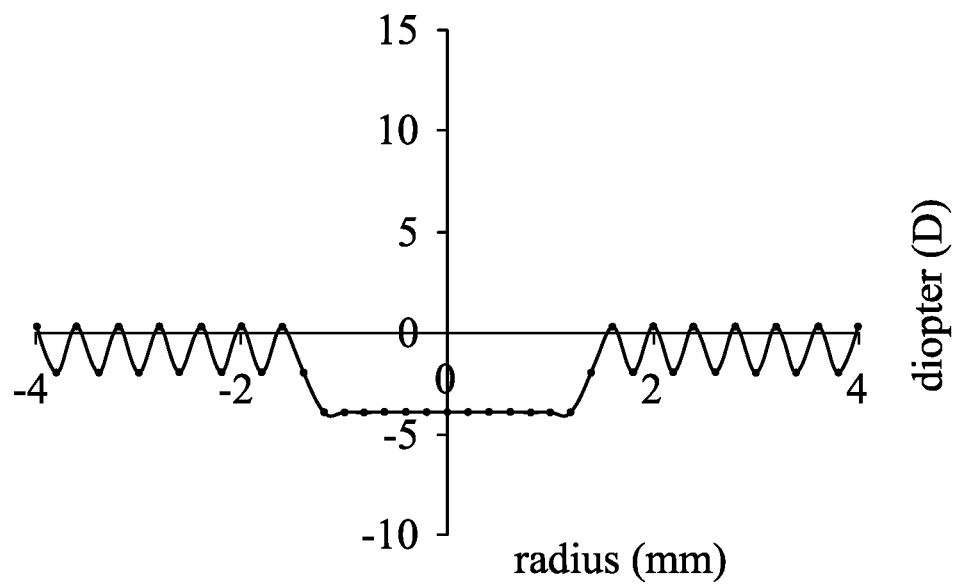
FIG. 14 shows a relationship between a radius and a diopter of a contact lens of the 5th example.

Please refer to Table 6 and FIG. 14 simultaneously. The radius and the correspondent diopter of the contact lens of the 5th example are listed in Table 6. FIG. 14 shows a relationship between the radius and the diopter of the contact lens of the 5th example (the negative radius has an opposite direction with the positive radius).

TABLE 6

5th example

| radius (mm) | diopter (D) |
| --- | --- |
| −4.0 | 0.25 |
| −3.8 | −2.00 |
| −3.6 | 0.25 |
| −3.4 | −2.00 |
| −3.2 | 0.25 |
| −3.0 | −2.00 |
| −2.8 | 0.25 |
| −2.6 | −2.00 |
| −2.4 | 0.25 |
| −2.2 | −2.00 |
| −2.0 | 0.25 |
| −1.8 | −2.00 |
| −1.6 | 0.25 |
| −1.4 | −2.00 |
| −1.2 | −4.00 |
| −1.0 | −4.00 |
| −0.8 | −4.00 |
| −0.6 | −4.00 |
| −0.4 | −4.00 |
| −0.2 | −4.00 |
| 0.0 | −4.00 |
| 0.2 | −4.00 |
| 0.4 | −4.00 |
| 0.6 | −4.00 |
| 0.8 | −4.00 |
| 1.0 | −4.00 |
| 1.2 | −4.00 |
| 1.4 | −2.00 |
| 1.6 | 0.25 |
| 1.8 | −2.00 |
| 2.0 | 0.25 |
| 2.2 | −2.00 |
| 2.4 | 0.25 |
| 2.6 | −2.00 |
| 2.8 | 0.25 |
| 3.0 | −2.00 |
| 3.2 | 0.25 |
| 3.4 | −2.00 |
| 3.6 | 0.25 |
| 3.8 | −2.00 |
| 4.0 | 0.25 |

Note:
the region with an absolute value of the radius smaller than or equal to 1.2 mm is the central region, and the region with the absolute value of the radius greater than 1.2 mm is the annular region.
Note:
the annular region includes, in order from the central point to a periphery, a high power of critical point of 0.25 D and a high power of critical point of −2.00 D.

In the contact lens according to the 5th example, the values of the parameters of POWC, PPmax, DiC, DiP, PPH, PPM, PPL, PCP1, PCP2, PCP3, PCP4, PCP5 and PCP6 and the values of relevant conditions thereof are listed in Table 7, and definitions of the aforementioned parameters can refer to the 1st example.

TABLE 7

5th example

| | |
| --- | --- |
| PowC (D) | −4.00 |
| PPmax (D | 0.25 |
| \|PPmax − POWC\| (D) | 4.25 |
| DiC (mm) | 2.4 |
| DiP (mm) | 8.0 |
| PPH (D) | 0.25, −2.00 |
| PPM (D) | — |
| PPL (D) | — |
| \|PPmax/PPH\| | 1.00, −0.125 |
| \|PPmax/PPL\| | — |
| PCP1 (D) | 0.25 |
| PCP2 (D) | −2.00 |
| PCP3 (D) | — |
| PCP4 (D) | — |
| PCP5 (D) | — |

TABLE 7-continued

5th example

| | |
| --- | --- |
| PCP6 (D) | — |
| PCP1 − POWC (D) | 4.25 |
| PCP2 − PCP1 (D) | −2.25 |
| PCP3 − PCP2 (D) | — |
| PCP4 − PCP3 (D) | — |
| PCP5 − PCP4 (D) | — |
| PCP6 − PCP5 (D) | — |
| (PCP2 − PCP1)/(PCP1 − POWC) | −0.53 |

In the contact lens according to the 5th example, a first critical point is CP1, a second critical point is CP2, a third critical point is CP3, a fourth critical point is CP4, a fifth critical point is CP5, and a sixth critical point is CP6. The classes of the aforementioned critical points of the 5th example are listed in Table 8.

TABLE 8

5th example

| | |
| --- | --- |
| CP1 | CH |
| CP2 | CH |
| CP3 | — |
| CP4 | — |
| CP5 | — |
| CP6 | — |

6th Example

In the 6th example, the contact lens includes a central region, an annular region and a peripheral region. The central region includes a central point O of the contact lens. The annular region symmetrically surrounds the central region. The peripheral region symmetrically surrounds the annular region. The peripheral region can include at least one color pattern portion. At least one light blocking ring can be disposed outside the central region. The structure of the contact lens of the 6th example can refer to FIG. 1. The color pattern portion can refer to FIG. 2A to FIG. 3C. The light blocking ring can refer to FIG. 4 to FIG. 11. The annular region includes two low critical points. The contact lens of the 6th example can include a cycloplegic agent according to practical demands.

Figure 15:
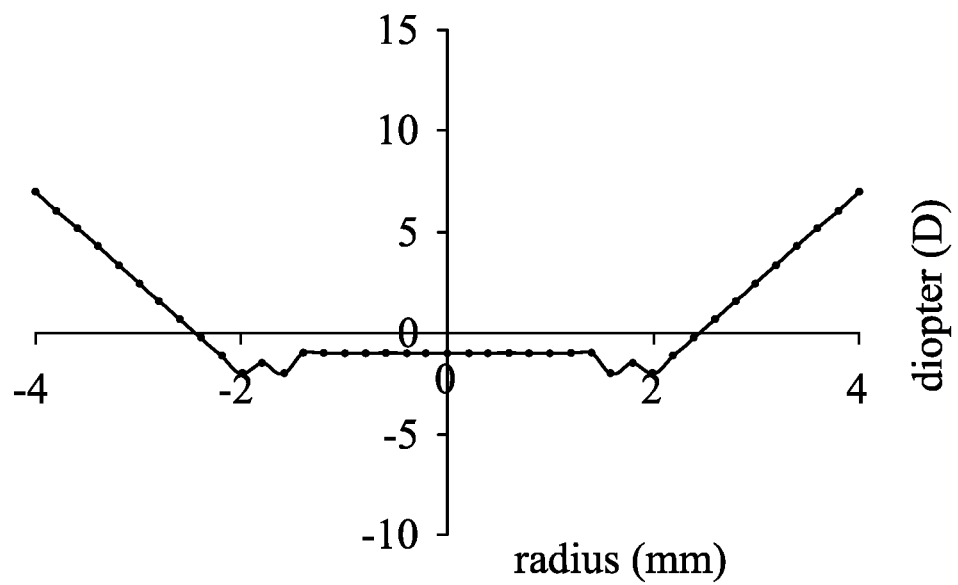
FIG. 15 shows a relationship between a radius and a diopter of a contact lens of the 6th example.

Please refer to Table 9 and FIG. 15 simultaneously. The radius and the correspondent diopter of the contact lens of the 6th example are listed in Table 9. FIG. 15 shows a relationship between the radius and the diopter of the contact lens of the 6th example (the negative radius has an opposite direction with the positive radius).

TABLE 9

6th example

| radius (mm) | diopter (D) |
| --- | --- |
| −4.0 | 7.00 |
| −3.8 | 6.10 |
| −3.6 | 5.20 |
| −3.4 | 4.30 |
| −3.2 | 3.40 |
| −3.0 | 2.50 |
| −2.8 | 1.60 |
| −2.6 | 0.70 |
| −2.4 | −0.20 |
| −2.2 | −1.10 |
| −2.0 | −2.00 |

TABLE 9-continued

| 6th example | |
|---|---|
| radius (mm) | diopter (D) |
| −1.8 | −1.50 |
| −1.6 | −2.00 |
| −1.4 | −1.00 |
| −1.2 | −1.00 |
| −1.0 | −1.00 |
| −0.8 | −1.00 |
| −0.6 | −1.00 |
| −0.4 | −1.00 |
| −0.2 | −1.00 |
| 0.0 | −1.00 |
| 0.2 | −1.00 |
| 0.4 | −1.00 |
| 0.6 | −1.00 |
| 0.8 | −1.00 |
| 1.0 | −1.00 |
| 1.2 | −1.00 |
| 1.4 | −1.00 |
| 1.6 | −2.00 |
| 1.8 | −1.50 |
| 2.0 | −2.00 |
| 2.2 | −1.10 |
| 2.4 | −0.20 |
| 2.6 | 0.70 |
| 2.8 | 1.60 |
| 3.0 | 2.50 |
| 3.2 | 3.40 |
| 3.4 | 4.30 |
| 3.6 | 5.20 |
| 3.8 | 6.10 |
| 4.0 | 7.00 |

Note:
the region with an absolute value of the radius smaller than or equal to 1.4 mm is the central region, and the region with the absolute value of the radius greater than 1.4 mm is the annular region.
Note:
the annular region includes, in order from the central point to a periphery, a low power of critical point of −2.00 D and a low power of critical point of −1.50 D.

In the contact lens according to the 6th example, the values of the parameters of POWC, PPmax, DiC, DiP, PPH, PPM, PPL, PCP1, PCP2, PCP3, PCP4, PCP5 and PCP6 and the values of relevant conditions thereof are listed in Table 10, and definitions of the aforementioned parameters can refer to the 1st example.

TABLE 10

| 6th example | |
|---|---|
| PowC (D) | −1.00 |
| PPmax (D | 7.00 |
| \|PPmax − POWC\| (D) | 8.00 |
| DiC (mm) | 2.8 |
| DiP (mm) | 8.0 |
| PPH (D) | — |
| PPM (D) | — |
| PPL (D) | −2.00, −1.50 |
| \|PPmax/PPH\| | — |
| \|PPmax/PPL\| | −3.50, −4.67 |
| PCP1 (D) | −2.00 |
| PCP2 (D) | −1.50 |
| PCP3 (D) | — |
| PCP4 (D) | — |
| PCP5 (D) | — |
| PCP6 (D) | — |
| PCP1 − POWC (D) | −1.00 |
| PCP2 − PCP1 (D) | 0.50 |
| PCP3 − PCP2 (D) | — |
| PCP4 − PCP3 (D) | — |
| PCP5 − PCP4 (D) | — |
| PCP6 − PCP5 (D) | — |
| (PCP2 − PCP1)/(PCP1 − POWC) | −0.50 |

In the contact lens according to the 6th example, a first critical point is CP1, a second critical point is CP2, a third critical point is CP3, a fourth critical point is CP4, a fifth critical point is CP5, and a sixth critical point is CP6. The classes of the aforementioned critical points of the 6th example are listed in Table 11.

TABLE 11

| 6th example | |
|---|---|
| CP1 | CL |
| CP2 | CL |
| CP3 | — |
| CP4 | — |
| CP5 | — |
| CP6 | — |

7th Example

In the 7th example, the contact lens includes a central region, an annular region and a peripheral region. The central region includes a central point O of the contact lens. The annular region symmetrically surrounds the central region. The peripheral region symmetrically surrounds the annular region. The peripheral region can include at least one color pattern portion. At least one light blocking ring can be disposed outside the central region. The structure of the contact lens of the 7th example can refer to FIG. 1. The color pattern portion can refer to FIG. 2A to FIG. 3C. The light blocking ring can refer to FIG. 4 to FIG. 11. The annular region includes two high critical points, a medium critical point and a low critical point. The contact lens of the 7th example can include a cycloplegic agent according to practical demands.

Figure 16:
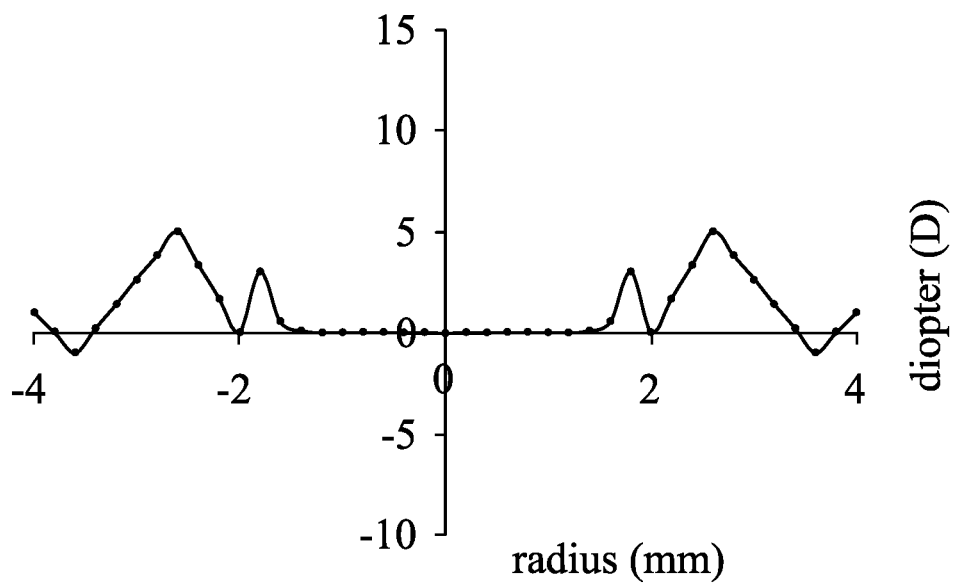
FIG. 16 shows a relationship between a radius and a diopter of a contact lens of the 7th example.

Please refer to Table 12 and FIG. 16 simultaneously. The radius and the correspondent diopter of the contact lens of the 7th example are listed in Table 12. FIG. 16 shows a relationship between the radius and the diopter of the contact lens of the 7th example (the negative radius has an opposite direction with the positive radius).

TABLE 12

| 7th example | |
|---|---|
| radius (mm) | diopter (D) |
| −4.0 | 1.00 |
| −3.8 | 0.00 |
| −3.6 | −1.00 |
| −3.4 | 0.20 |
| −3.2 | 1.40 |
| −3.0 | 2.60 |
| −2.8 | 3.80 |
| −2.6 | 5.00 |
| −2.4 | 3.33 |
| −2.2 | 1.67 |
| −2.0 | 0 |
| −1.8 | 3.00 |
| −1.6 | 0.55 |
| −1.4 | 0.10 |
| −1.2 | 0 |
| −1.0 | 0 |
| −0.8 | 0 |
| −0.6 | 0 |
| −0.4 | 0 |
| −0.2 | 0 |
| 0.0 | 0 |
| 0.2 | 0 |
| 0.4 | 0 |
| 0.6 | 0 |
| 0.8 | 0 |
| 1.0 | 0 |

TABLE 12-continued

7th example

| radius (mm) | diopter (D) |
|---|---|
| 1.2 | 0 |
| 1.4 | 0.10 |
| 1.6 | 0.55 |
| 1.8 | 3.00 |
| 2.0 | 0 |
| 2.2 | 1.67 |
| 2.4 | 3.33 |
| 2.6 | 5.00 |
| 2.8 | 3.80 |
| 3.0 | 2.60 |
| 3.2 | 1.40 |
| 3.4 | 0.20 |
| 3.6 | −1.00 |
| 3.8 | 0.00 |
| 4.0 | 1.00 |

Note:
the region with an absolute value of the radius smaller than or equal to 1.2 mm is the central region, and the region with the absolute value of the radius greater than 1.2 mm is the annular region.

Note:
the annular region includes, in order from the central point to a periphery, a high power of critical point of 3.00 D, a medium power of critical point of 0 D, a high power of critical point of 5.00 D, and a low power of critical point of −1.00 D.

In the contact lens according to the 7th example, the values of the parameters of POWC, PPmax, DiC, DiP, PPH, PPM, PPL, PCP1, PCP2, PCP3, PCP4, PCP5 and PCP6 and the values of relevant conditions thereof are listed in Table 13, and definitions of the aforementioned parameters can refer to the 1st example.

TABLE 13

7th example

| | |
|---|---|
| PowC (D) | 0.00 |
| PPmax (D | 5.00 |
| \|PPmax − POWC\| (D) | 5.00 |
| DiC (mm) | 2.4 |
| DiP (mm) | 8.0 |
| PPH (D) | 3.00, 5.00 |
| PPM (D) | 0 |
| PPL (D) | −1.00 |
| \|PPmax/PPH\| | 1.67, 1.00 |
| \|PPmax/PPL\| | −5.00 |
| PCP1 (D) | 3.00 |
| PCP2 (D) | 0.00 |
| PCP3 (D) | 5.00 |
| PCP4 (D) | −1.00 |
| PCP5 (D) | — |
| PCP6 (D) | — |
| PCP1 − POWC (D) | 3.00 |
| PCP2 − PCP1 (D) | −3.00 |
| PCP3 − PCP2 (D) | 5.00 |
| PCP4 − PCP3 (D) | −6.00 |
| PCP5 − PCP4 (D) | — |
| PCP6 − PCP5 (D) | — |
| (PCP2 − PCP1)/(PCP1 − POWC) | −1.00 |

In the contact lens according to the 7th example, a first critical point is CP1, a second critical point is CP2, a third critical point is CP3, a fourth critical point is CP4, a fifth critical point is CP5, and a sixth critical point is CP6. The classes of the aforementioned critical points of the 7th example are listed in Table 14.

TABLE 14

7th example

| | |
|---|---|
| CP1 | CH |
| CP2 | CM |
| CP3 | CH |
| CP4 | CL |
| CP5 | — |
| CP6 | — |

8th Example

In the 8th example, the contact lens includes a central region, an annular region and a peripheral region. The central region includes a central point O of the contact lens. The annular region symmetrically surrounds the central region. The peripheral region symmetrically surrounds the annular region. The peripheral region can include at least one color pattern portion. At least one light blocking ring can be disposed outside the central region. The structure of the contact lens of the 8th example can refer to FIG. 1. The color pattern portion can refer to FIG. 2A to FIG. 3C. The light blocking ring can refer to FIG. 4 to FIG. 11. The annular region includes a high critical point and two low critical points. The contact lens of the 8th example can include a cycloplegic agent according to practical demands.

9th Example

In the 9th example, the contact lens includes a central region, an annular region and a peripheral region. The central region includes a central point O of the contact lens. The annular region symmetrically surrounds the central region. The peripheral region symmetrically surrounds the annular region. The peripheral region can include at least one color pattern portion. At least one light blocking ring can be disposed outside the central region. The structure of the contact lens of the 9th example can refer to FIG. 1. The color pattern portion can refer to FIG. 2A to FIG. 3C. The light blocking ring can refer to FIG. 4 to FIG. 11. The annular region includes two high critical points, a medium critical point and two low critical points. The contact lens of the 9th example can include a cycloplegic agent according to practical demands.

Figure 17:
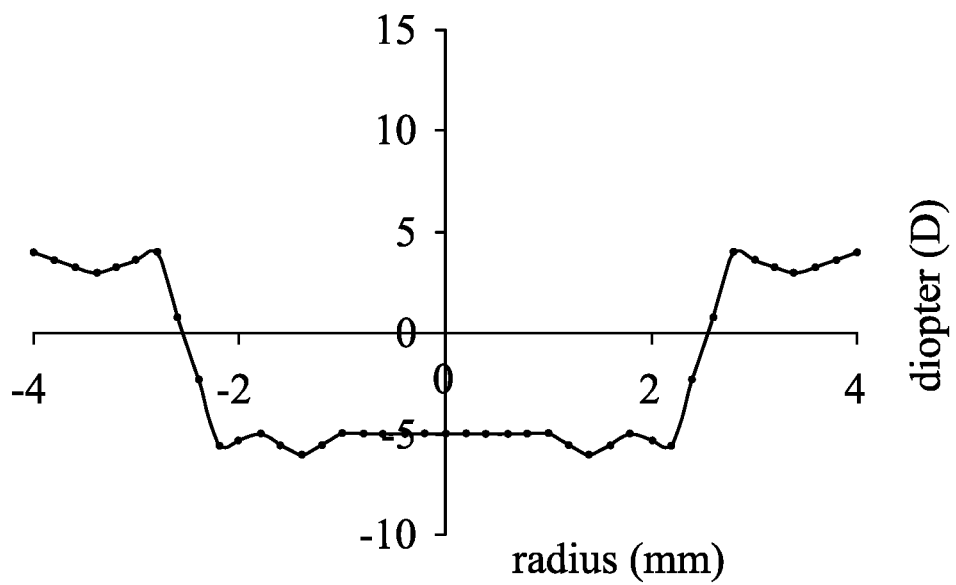
FIG. 17 shows a relationship between a radius and a diopter of a contact lens of the 9th example.

Please refer to Table 15 and FIG. 17 simultaneously. The radius and the correspondent diopter of the contact lens of the 9th example are listed in Table 15. FIG. 17 shows a relationship between the radius and the diopter of the contact lens of the 9th example (the negative radius has an opposite direction with the positive radius).

TABLE 15

9th example

| radius (mm) | diopter (D) |
|---|---|
| −4.0 | 4.00 |
| −3.8 | 3.67 |
| −3.6 | 3.33 |
| −3.4 | 3.00 |
| −3.2 | 3.33 |
| −3.0 | 3.67 |
| −2.8 | 4.00 |
| −2.6 | 0.83 |
| −2.4 | −2.33 |
| −2.2 | −5.50 |
| −2.0 | −5.25 |
| −1.8 | −5.00 |
| −1.6 | −5.50 |

TABLE 15-continued

9th example

| radius (mm) | diopter (D) |
|---|---|
| −1.4 | −6.00 |
| −1.2 | −5.50 |
| −1.0 | −5.00 |
| −0.8 | −5.00 |
| −0.6 | −5.00 |
| −0.4 | −5.00 |
| −0.2 | −5.00 |
| 0.0 | −5.00 |
| 0.2 | −5.00 |
| 0.4 | −5.00 |
| 0.6 | −5.00 |
| 0.8 | −5.00 |
| 1.0 | −5.00 |
| 1.2 | −5.50 |
| 1.4 | −6.00 |
| 1.6 | −5.50 |
| 1.8 | −5.00 |
| 2.0 | −5.25 |
| 2.2 | −5.50 |
| 2.4 | −2.33 |
| 2.6 | 0.83 |
| 2.8 | 4.00 |
| 3.0 | 3.67 |
| 3.2 | 3.33 |
| 3.4 | 3.00 |
| 3.6 | 3.33 |
| 3.8 | 3.67 |
| 4.0 | 4.00 |

Note:
the region with an absolute value of the radius smaller than or equal to 1.0 mm is the central region, and the region with the absolute value of the radius greater than 1.0 mm is the annular region.

Note:
the annular region includes, in order from the central point to a periphery, a low power of critical point of −6.00 D, a medium power of critical point of −5.00 D, a low power of critical point of −5.50 D, a high power of critical point of 4.00 D, and a high power of critical point of 3.00 D.

In the contact lens according to the 9th example, the values of the parameters of POWC, PPmax, DiC, DiP, PPH, PPM, PPL, PCP1, PCP2, PCP3, PCP4, PCP5 and PCP6 and the values of relevant conditions thereof are listed in Table 16, and definitions of the aforementioned parameters can refer to the 1st example.

TABLE 16

9th example

| | |
|---|---|
| PowC (D) | −5.00 |
| PPmax (D | 4.00 |
| \|PPmax − POWC\| (D) | 9.00 |
| DiC (mm) | 2 |
| DiP (mm) | 8.0 |
| PPH (D) | 4.00, 3.00 |
| PPM (D) | −5.00 |
| PPL (D) | −6.00, −5.50 |
| \|PPmax/PPH\| | 1.00, 1.33 |
| \|PPmax/PPL\| | −0.67, −0.73 |
| PCP1 (D) | −6.00 |
| PCP2 (D) | −5.00 |
| PCP3 (D) | −5.50 |
| PCP4 (D) | 4.00 |
| PCP5 (D) | 3.00 |
| PCP6 (D) | — |
| PCP1 − POWC (D) | −1.00 |
| PCP2 − PCP1 (D) | 1.00 |
| PCP3 − PCP2 (D) | −0.50 |
| PCP4 − PCP3 (D) | 9.50 |
| PCP5 − PCP4 (D) | −1.00 |
| PCP6 − PCP5 (D) | — |
| (PCP2 − PCP1)/(PCP1 − POWC) | −1.00 |

In the contact lens according to the 9th example, a first critical point is CP1, a second critical point is CP2, a third critical point is CP3, a fourth critical point is CP4, a fifth critical point is CP5, and a sixth critical point is CP6. The classes of the aforementioned critical points of the 9th example are listed in Table 17.

TABLE 17

9th example

| | |
|---|---|
| CP1 | CL |
| CP2 | CM |
| CP3 | CL |
| CP4 | CH |
| CP5 | CH |
| CP6 | — |

10th Example

In the 10th example, the contact lens includes a central region, an annular region and a peripheral region. The central region includes a central point O of the contact lens. The annular region symmetrically surrounds the central region. The peripheral region symmetrically surrounds the annular region. The peripheral region can include at least one color pattern portion. At least one light blocking ring can be disposed outside the central region. The structure of the contact lens of the 10th example can refer to FIG. 1. The color pattern portion can refer to FIG. 2A to FIG. 3C. The light blocking ring can refer to FIG. 4 to FIG. 11. The annular region includes three high critical points. The contact lens of the 10th example can include a cycloplegic agent according to practical demands.

Figure 18:
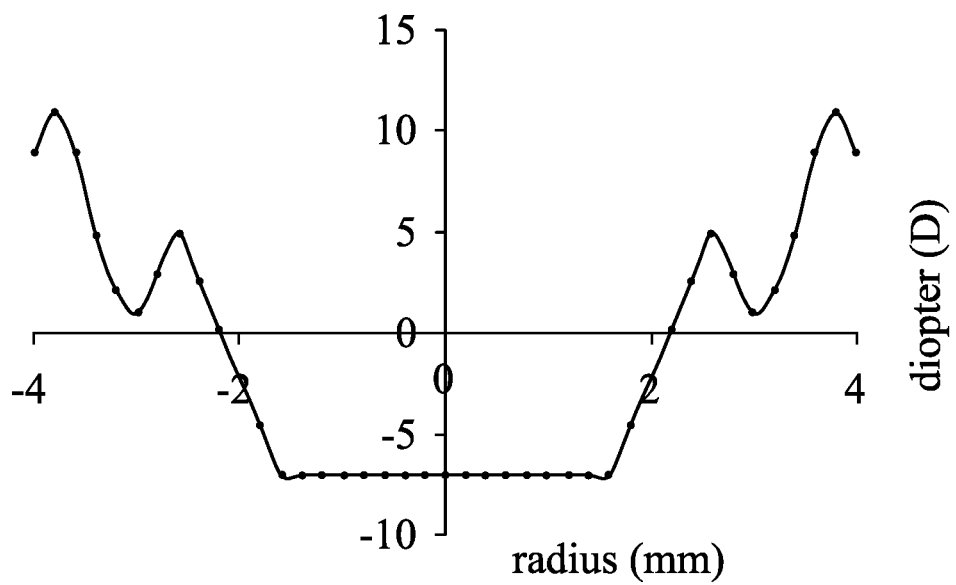
FIG. 18 shows a relationship between a radius and a diopter of a contact lens of the 10th example.

Please refer to Table 18 and FIG. 18 simultaneously. The radius and the correspondent diopter of the contact lens of the 10th example are listed in Table 18. FIG. 18 shows a relationship between the radius and the diopter of the contact lens of the 10th example (the negative radius has an opposite direction with the positive radius).

TABLE 18

10th example

| radius (mm) | diopter (D) |
|---|---|
| −4.0 | 9.00 |
| −3.8 | 11.00 |
| −3.6 | 9.00 |
| −3.4 | 4.95 |
| −3.2 | 2.22 |
| −3.0 | 1.00 |
| −2.8 | 3.00 |
| −2.6 | 5.00 |
| −2.4 | 2.60 |
| −2.2 | 0.20 |
| −2.0 | −2.20 |
| −1.8 | −4.60 |
| −1.6 | −7.00 |
| −1.4 | −7.00 |
| −1.2 | −7.00 |
| −1.0 | −7.00 |
| −0.8 | −7.00 |
| −0.6 | −7.00 |
| −0.4 | −7.00 |
| −0.2 | −7.00 |
| 0.0 | −7.00 |
| 0.2 | −7.00 |
| 0.4 | −7.00 |
| 0.6 | −7.00 |
| 0.8 | −7.00 |
| 1.0 | −7.00 |
| 1.2 | −7.00 |
| 1.4 | −7.00 |

TABLE 18-continued

10th example

| radius (mm) | diopter (D) |
|---|---|
| 1.6 | −7.00 |
| 1.8 | −4.60 |
| 2.0 | −2.20 |
| 2.2 | 0.20 |
| 2.4 | 2.60 |
| 2.6 | 5.00 |
| 2.8 | 3.00 |
| 3.0 | 1.00 |
| 3.2 | 2.22 |
| 3.4 | 4.95 |
| 3.6 | 9.00 |
| 3.8 | 11.00 |
| 4.0 | 9.00 |

Note:
the region with an absolute value of the radius smaller than or equal to 1.6 mm is the central region, and the region with the absolute value of the radius greater than 1.6 mm is the annular region.

Note:
the annular region includes, in order from the central point to a periphery, a high power of critical point of 5.00 D, a high power of critical point of 1.00 D, and a high power of critical point of 11.00 D.

In the contact lens according to the 10th example, the values of the parameters of POWC, PPmax, DiC, DiP, PPH, PPM, PPL, PCP1, PCP2, PCP3, PCP4, PCP5 and PCP6 and the values of relevant conditions thereof are listed in Table 19, and definitions of the aforementioned parameters can refer to the 1st example.

TABLE 19

| | 10th example |
|---|---|
| PowC (D) | −7.00 |
| PPmax (D) | 11.00 |
| |PPmax − POWC| (D) | 18.00 |
| DiC (mm) | 3.2 |
| DiP (mm) | 8.0 |
| PPH (D) | 5.00, 1.00, 11.00 |
| PPM (D) | — |
| PPL (D) | — |
| |PPmax/PPH| | 2.20, 11.00, 1.00 |
| |PPmax/PPL| | — |
| PCP1 (D) | 5.00 |
| PCP2 (D) | 1.00 |
| PCP3 (D) | 11.00 |
| PCP4 (D) | — |
| PCP5 (D) | — |
| PCP6 (D) | — |
| PCP1 − POWC (D) | 12.00 |
| PCP2 − PCP1 (D) | −4.00 |
| PCP3 − PCP2 (D) | 10.00 |
| PCP4 − PCP3 (D) | — |
| PCP5 − PCP4 (D) | — |
| PCP6 − PCP5 (D) | — |
| (PCP2 − PCP1)/(PCP1 − POWC) | 0.33 |

In the contact lens according to the 10th example, a first critical point is CP1, a second critical point is CP2, a third critical point is CP3, a fourth critical point is CP4, a fifth critical point is CP5, and a sixth critical point is CP6. The classes of the aforementioned critical points of the 10th example are listed in Table 20.

TABLE 20

| | 10th example |
|---|---|
| CP1 | CH |
| CP2 | CH |
| CP3 | CH |
| CP4 | — |
| CP5 | — |
| CP6 | — |

11th Example

In the 11th example, the contact lens includes a central region, an annular region and a peripheral region. The central region includes a central point O of the contact lens. The annular region symmetrically surrounds the central region. The peripheral region symmetrically surrounds the annular region. The peripheral region can include at least one color pattern portion. At least one light blocking ring can be disposed outside the central region. The structure of the contact lens of the 11th example can refer to FIG. 1. The color pattern portion can refer to FIG. 2A to FIG. 3C. The light blocking ring can refer to FIG. 4 to FIG. 11. The annular region includes a medium critical point and three low critical points. The contact lens of the 11th example can include a cycloplegic agent according to practical demands.

12th Example

In the 12th example, the contact lens includes a central region, an annular region and a peripheral region. The central region includes a central point O of the contact lens. The annular region symmetrically surrounds the central region. The peripheral region symmetrically surrounds the annular region. The peripheral region can include at least one color pattern portion. At least one light blocking ring can be disposed outside the central region. The structure of the contact lens of the 12th example can refer to FIG. 1. The color pattern portion can refer to FIG. 2A to FIG. 3C. The light blocking ring can refer to FIG. 4 to FIG. 11. The annular region includes three high critical points and a low critical point. The contact lens of the 12th example can include a cycloplegic agent according to practical demands.

Figure 19:
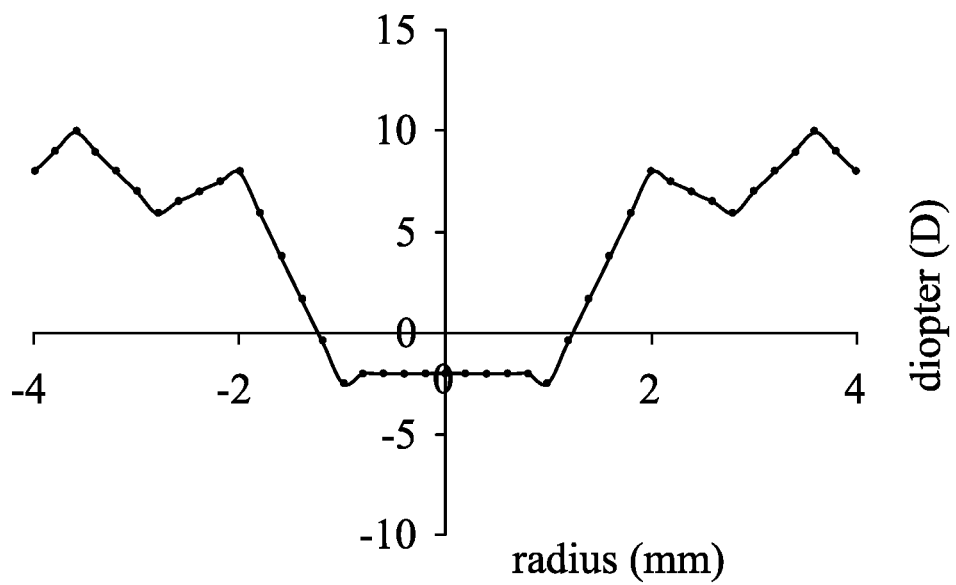
FIG. 19 shows a relationship between a radius and a diopter of a contact lens of the 12th example.

Please refer to Table 21 and FIG. 19 simultaneously. The radius and the correspondent diopter of the contact lens of the 12th example are listed in Table 21. FIG. 19 shows a relationship between the radius and the diopter of the contact lens of the 12th example (the negative radius has an opposite direction with the positive radius).

TABLE 21

12th example

| radius (mm) | diopter (D) |
|---|---|
| −4.0 | 8.00 |
| −3.8 | 9.00 |
| −3.6 | 10.00 |
| −3.4 | 9.00 |
| −3.2 | 8.00 |
| −3.0 | 7.00 |
| −2.8 | 6.00 |
| −2.6 | 6.50 |
| −2.4 | 7.00 |
| −2.2 | 7.50 |
| −2.0 | 8.00 |
| −1.8 | 5.90 |
| −1.6 | 3.80 |
| −1.4 | 1.70 |
| −1.2 | −0.40 |
| −1.0 | −2.50 |
| −0.8 | −2.00 |

TABLE 21-continued

12th example

| radius (mm) | diopter (D) |
| --- | --- |
| −0.6 | −2.00 |
| −0.4 | −2.00 |
| −0.2 | −2.00 |
| 0.0 | −2.00 |
| 0.2 | −2.00 |
| 0.4 | −2.00 |
| 0.6 | −2.00 |
| 0.8 | −2.00 |
| 1.0 | −2.50 |
| 1.2 | −0.40 |
| 1.4 | 1.70 |
| 1.6 | 3.80 |
| 1.8 | 5.90 |
| 2.0 | 8.00 |
| 2.2 | 7.50 |
| 2.4 | 7.00 |
| 2.6 | 6.50 |
| 2.8 | 6.00 |
| 3.0 | 7.00 |
| 3.2 | 8.00 |
| 3.4 | 9.00 |
| 3.6 | 10.00 |
| 3.8 | 9.00 |
| 4.0 | 8.00 |

Note:
the region with an absolute value of the radius smaller than or equal to 0.8 mm is the central region, and the region with the absolute value of the radius greater than 0.8 mm is the annular region.

Note:
the annular region includes, in order from the central point to a periphery, a low power of critical point of −2.50 D, a high power of critical point of 8.00 D, a high power of critical point of 6.00 D, and a high power of critical point of 10.00 D.

In the contact lens according to the 12th example, the values of the parameters of POWC, PPmax, DiC, DiP, PPH, PPM, PPL, PCP1, PCP2, PCP3, PCP4, PCP5 and PCP6 and the values of relevant conditions thereof are listed in Table 22, and definitions of the aforementioned parameters can refer to the 1st example.

TABLE 22

| | 12th example |
| --- | --- |
| PowC (D) | −2.00 |
| PPmax (D | 10.00 |
| \|PPmax − POWC\| (D) | 12.00 |
| DiC (mm) | 1.6 |
| DiP (mm) | 8.0 |
| PPH (D) | 8.00, 6.00, 10.00 |
| PPM (D) | — |
| PPL (D) | −2.50 |
| \|PPmax/PPH\| | 1.25, 1.67, 1.00 |
| \|PPmax/PPL\| | −4.00 |
| PCP1 (D) | −2.50 |
| PCP2 (D) | 8.00 |
| PCP3 (D) | 6.00 |
| PCP4 (D) | 10.00 |
| PCP5 (D) | — |
| PCP6 (D) | — |
| PCP1 − POWC (D) | −0.50 |
| PCP2 − PCP1 (D) | 10.50 |
| PCP3 − PCP2 (D) | −2.00 |
| PCP4 − PCP3 (D) | 4.00 |
| PCP5 − PCP4 (D) | — |
| PCP6 − PCP5 (D) | — |
| (PCP2 − PCP1)/(PCP1 − POWC) | −21.00 |

In the contact lens according to the 12th example, a first critical point is CP1, a second critical point is CP2, a third critical point is CP3, a fourth critical point is CP4, a fifth critical point is CP5, and a sixth critical point is CP6. The classes of the aforementioned critical points of the 12th example are listed in Table 23.

TABLE 23

12th example

| | |
| --- | --- |
| CP1 | CL |
| CP2 | CH |
| CP3 | CH |
| CP4 | CH |
| CP5 | — |
| CP6 | — |

13th Example

In the 13th example, the contact lens includes a central region, an annular region and a peripheral region. The central region includes a central point O of the contact lens. The annular region symmetrically surrounds the central region. The peripheral region symmetrically surrounds the annular region. The peripheral region can include at least one color pattern portion. At least one light blocking ring can be disposed outside the central region. The structure of the contact lens of the 13th example can refer to FIG. 1. The color pattern portion can refer to FIG. 2A to FIG. 3C. The light blocking ring can refer to FIG. 4 to FIG. 11. The annular region includes a high critical point and three low critical points. The contact lens of the 13th example can include a cycloplegic agent according to practical demands.

14th Example

In the 14th example, the contact lens includes a central region, an annular region and a peripheral region. The central region includes a central point O of the contact lens. The annular region symmetrically surrounds the central region. The peripheral region symmetrically surrounds the annular region. The peripheral region can include at least one color pattern portion. At least one light blocking ring can be disposed outside the central region. The structure of the contact lens of the 14th example can refer to FIG. 1. The color pattern portion can refer to FIG. 2A to FIG. 3C. The light blocking ring can refer to FIG. 4 to FIG. 11. The annular region includes three high critical points, a medium critical point and two low critical points. The contact lens of the 14th example can include a cycloplegic agent according to practical demands.

15th Example

In the 15th example, the contact lens includes a central region, an annular region and a peripheral region. The central region includes a central point O of the contact lens. The annular region symmetrically surrounds the central region. The peripheral region symmetrically surrounds the annular region. The peripheral region can include at least one color pattern portion. At least one light blocking ring can be disposed outside the central region. The structure of the contact lens of the 15th example can refer to FIG. 1. The color pattern portion can refer to FIG. 2A to FIG. 3C. The light blocking ring can refer to FIG. 4 to FIG. 11. The annular region includes two high critical points and three low critical points. The contact lens of the 15th example can include a cycloplegic agent according to practical demands.

16th Example

In the 16th example, the contact lens includes a central region, an annular region and a peripheral region. The central region includes a central point O of the contact lens. The annular region symmetrically surrounds the central region. The peripheral region symmetrically surrounds the annular region. The peripheral region can include at least one color pattern portion. At least one light blocking ring can be disposed outside the central region. The structure of the contact lens of the 16th example can refer to FIG. 1. The color pattern portion can refer to FIG. 2A to FIG. 3C. The light blocking ring can refer to FIG. 4 to FIG. 11. The annular region includes three high critical points and three low critical points. The contact lens of the 16th example can include a cycloplegic agent according to practical demands.

Figure 20:
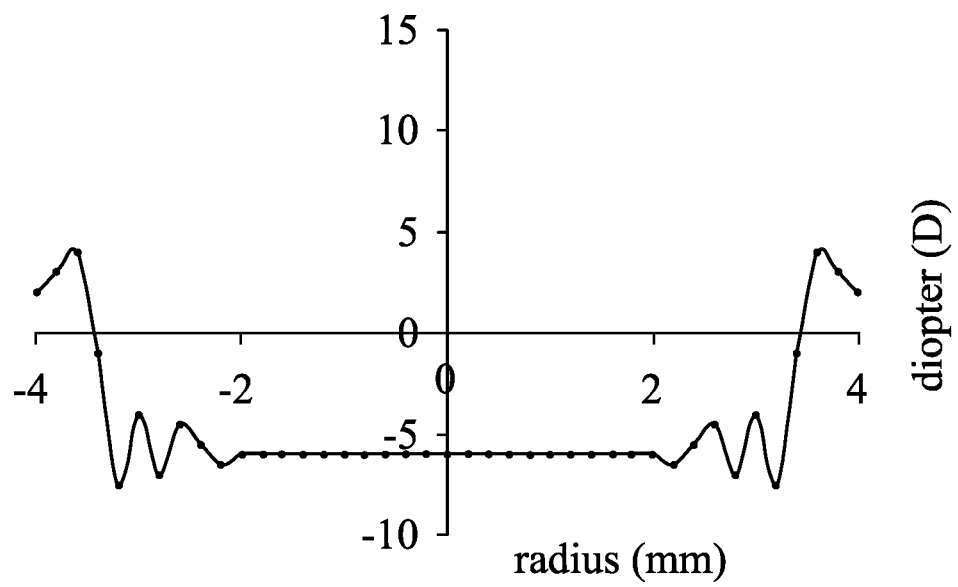
FIG. 20 shows a relationship between a radius and a diopter of a contact lens of the 16th example.

Please refer to Table 24 and FIG. 20 simultaneously. The radius and the correspondent diopter of the contact lens of the 16th example are listed in Table 24. FIG. 20 shows a relationship between the radius and the diopter of the contact lens of the 16th example (the negative radius has an opposite direction with the positive radius).

TABLE 24

16th example

| radius (mm) | diopter (D) |
|---|---|
| −4.0 | 2.00 |
| −3.8 | 3.00 |
| −3.6 | 4.00 |
| −3.4 | −1.00 |
| −3.2 | −7.50 |
| −3.0 | −4.00 |
| −2.8 | −7.00 |
| −2.6 | −4.50 |
| −2.4 | −5.50 |
| −2.2 | −6.50 |
| −2.0 | −6.00 |
| −1.8 | −6.00 |
| −1.6 | −6.00 |
| −1.4 | −6.00 |
| −1.2 | −6.00 |
| −1.0 | −6.00 |
| −0.8 | −6.00 |
| −0.6 | −6.00 |
| −0.4 | −6.00 |
| −0.2 | −6.00 |
| 0.0 | −6.00 |
| 0.2 | −6.00 |
| 0.4 | −6.00 |
| 0.6 | −6.00 |
| 0.8 | −6.00 |
| 1.0 | −6.00 |
| 1.2 | −6.00 |
| 1.4 | −6.00 |
| 1.6 | −6.00 |
| 1.8 | −6.00 |
| 2.0 | −6.00 |
| 2.2 | −6.50 |
| 2.4 | −5.50 |
| 2.6 | −4.50 |
| 2.8 | −7.00 |
| 3.0 | −4.00 |
| 3.2 | −7.50 |
| 3.4 | −1.00 |
| 3.6 | 4.00 |
| 3.8 | 3.00 |
| 4.0 | 2.00 |

Note:
the region with an absolute value of the radius smaller than or equal to 2.0 mm is the central region, and the region with the absolute value of the radius greater than 2.0 mm is the annular region.

Note:
the annular region includes, in order from the central point to a periphery, a low power of critical point of −6.50 D, a high power of critical point of −4.50 D, a low power of critical point of −7.00 D, a high power of critical point of −4.00 D, a low power of critical point of −7.50 D, and a high power of critical point of 4.00 D.

In the contact lens according to the 16th example, the values of the parameters of POWC, PPmax, DiC, DiP, PPH, PPM, PPL, PCP1, PCP2, PCP3, PCP4, PCP5 and PCP6 and the values of relevant conditions thereof are listed in Table 25, and definitions of the aforementioned parameters can refer to the 1st example.

TABLE 25

| 16th example | |
|---|---|
| PowC (D) | −6.00 |
| PPmax (D | 4.00 |
| |PPmax − POWC| (D) | 10.00 |
| DiC (mm) | 4 |
| DiP (mm) | 8.0 |
| PPH (D) | −4.50, −4.00, 4.00 |
| PPM (D) | — |
| PPL (D) | −6.50, −7.00, −7.50 |
| |PPmax/PPH| | −0.89, −1.00, 1.00 |
| |PPmax/PPL| | −0.62, −0.57, −0.53 |
| PCP1 (D) | −6.50 |
| PCP2 (D) | −4.50 |
| PCP3 (D) | −7.00 |
| PCP4 (D) | −4.00 |
| PCP5 (D) | −7.50 |
| PCP6 (D) | 4.00 |
| PCP1 − POWC (D) | −0.50 |
| PCP2 − PCP1 (D) | 2.00 |
| PCP3 − PCP2 (D) | −2.50 |
| PCP4 − PCP3 (D) | 3.00 |
| PCP5 − PCP4 (D) | −3.50 |
| PCP6 − PCP5 (D) | 11.50 |
| (PCP2 − PCP1)/(PCP1 − POWC) | −4.00 |

In the contact lens according to the 16th example, a first critical point is CP1, a second critical point is CP2, a third critical point is CP3, a fourth critical point is CP4, a fifth critical point is CP5, and a sixth critical point is CP6. The classes of the aforementioned critical points of the 16th example are listed in Table 26.

TABLE 26

| 16th example | |
|---|---|
| CP1 | CL |
| CP2 | CH |
| CP3 | CL |
| CP4 | CH |
| CP5 | CL |
| CP6 | CH |

17th Example

In the 17th example, the contact lens includes a central region, an annular region and a peripheral region. The central region includes a central point O of the contact lens. The annular region symmetrically surrounds the central region. The peripheral region symmetrically surrounds the annular region. The peripheral region can include at least one color pattern portion. At least one light blocking ring can be disposed outside the central region. The structure of the contact lens of the 17th example can refer to FIG. 1. The color pattern portion can refer to FIG. 2A to FIG. 3C. The light blocking ring can refer to FIG. 4 to FIG. 11. The annular region includes four high critical points and a medium critical point. The contact lens of the 17th example can include a cycloplegic agent according to practical demands.

18th Example

In the 18th example, the contact lens includes a central region, an annular region and a peripheral region. The central region includes a central point O of the contact lens. The annular region symmetrically surrounds the central region. The peripheral region symmetrically surrounds the annular region. The peripheral region can include at least one color pattern portion. At least one light blocking ring can be disposed outside the central region. The structure of the contact lens of the 18th example can refer to FIG. 1. The color pattern portion can refer to FIG. 2A to FIG. 3C. The light blocking ring can refer to FIG. 4 to FIG. 11. The annular region includes four low critical points. The contact lens of the 18th example can include a cycloplegic agent according to practical demands.

19th Example

In the 19th example, the contact lens includes a central region, an annular region and a peripheral region. The central region includes a central point O of the contact lens. The annular region symmetrically surrounds the central region. The peripheral region symmetrically surrounds the annular region. The peripheral region can include at least one color pattern portion. At least one light blocking ring can be disposed outside the central region. The structure of the contact lens of the 19th example can refer to FIG. 1. The color pattern portion can refer to FIG. 2A to FIG. 3C. The light blocking ring can refer to FIG. 4 to FIG. 11. The annular region includes four high critical points, two medium critical points and a low critical point. The contact lens of the 19th example can include a cycloplegic agent according to practical demands.

20th Example

In the 20th example, the contact lens includes a central region, an annular region and a peripheral region. The central region includes a central point O of the contact lens. The annular region symmetrically surrounds the central region. The peripheral region symmetrically surrounds the annular region. The peripheral region can include at least one color pattern portion. At least one light blocking ring can be disposed outside the central region. The structure of the contact lens of the 20th example can refer to FIG. 1. The color pattern portion can refer to FIG. 2A to FIG. 3C. The light blocking ring can refer to FIG. 4 to FIG. 11. The annular region includes a high critical point, a medium critical point and four low critical points. The contact lens of the 20th example can include a cycloplegic agent according to practical demands.

21st Example

In the 21st example, the contact lens includes a central region, an annular region and a peripheral region. The central region includes a central point O of the contact lens. The annular region symmetrically surrounds the central region. The peripheral region symmetrically surrounds the annular region. The peripheral region can include at least one color pattern portion. At least one light blocking ring can be disposed outside the central region. The structure of the contact lens of the 21st example can refer to FIG. 1. The color pattern portion can refer to FIG. 2A to FIG. 3C. The light blocking ring can refer to FIG. 4 to FIG. 11. The annular region includes four high critical points and two low critical points. The contact lens of the 21st example can include a cycloplegic agent according to practical demands.

Figure 21:
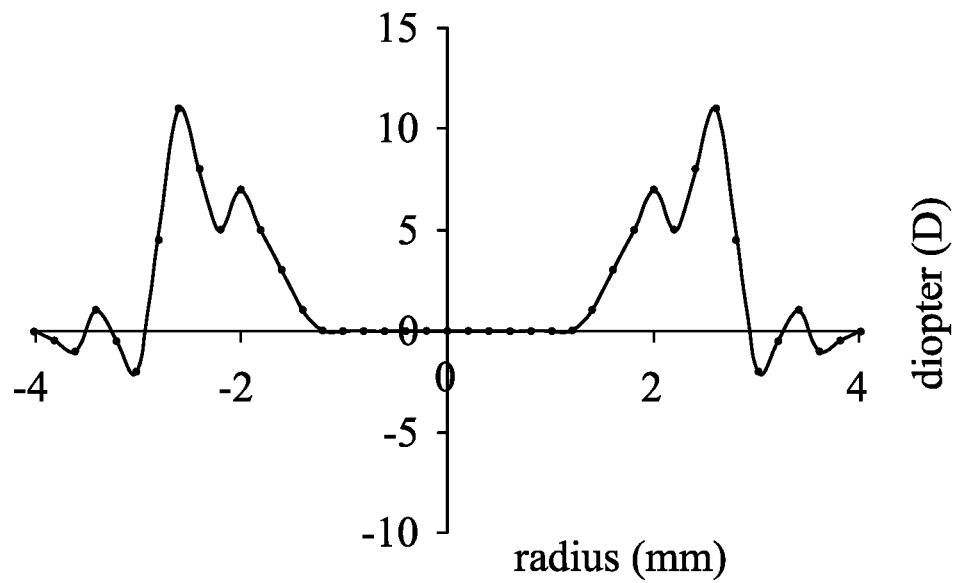
FIG. 21 shows a relationship between a radius and a diopter of a contact lens of the 21st example.

Please refer to Table 27 and FIG. 21 simultaneously. The radius and the correspondent diopter of the contact lens of the 21st example are listed in Table 27. FIG. 21 shows a relationship between the radius and the diopter of the contact lens of the 21st example (the negative radius has an opposite direction with the positive radius).

TABLE 27

| 21st example | |
| --- | --- |
| radius (mm) | diopter (D) |
| −4.0 | 0.00 |
| −3.8 | −0.50 |
| −3.6 | −1.00 |
| −3.4 | 1.00 |
| −3.2 | −0.50 |
| −3.0 | −2.00 |
| −2.8 | 4.50 |
| −2.6 | 11.00 |
| −2.4 | 8.00 |
| −2.2 | 5.00 |
| −2.0 | 7.00 |
| −1.8 | 5.00 |
| −1.6 | 3.00 |
| −1.4 | 1.00 |
| −1.2 | 0 |
| −1.0 | 0 |
| −0.8 | 0 |
| −0.6 | 0 |
| −0.4 | 0 |
| −0.2 | 0 |
| 0.0 | 0 |
| 0.2 | 0 |
| 0.4 | 0 |
| 0.6 | 0 |
| 0.8 | 0 |
| 1.0 | 0 |
| 1.2 | 0 |
| 1.4 | 1.00 |
| 1.6 | 3.00 |
| 1.8 | 5.00 |
| 2.0 | 7.00 |
| 2.2 | 5.00 |
| 2.4 | 8.00 |
| 2.6 | 11.00 |
| 2.8 | 4.50 |
| 3.0 | −2.00 |
| 3.2 | −0.50 |
| 3.4 | 1.00 |
| 3.6 | −1.00 |
| 3.8 | −0.50 |
| 4.0 | 0.00 |

Note:
the region with an absolute value of the radius smaller than or equal to 1.2 mm is the central region, and the region with the absolute value of the radius greater than 1.2 mm is the annular region.

Note:
the annular region includes, in order from the central point to a periphery, a high power of critical point of 7.00 D, a high power of critical point of 5.00 D, a high power of critical point of 11.00 D, a low power of critical point of −2.00 D, a high power of critical point of 1.00 D, and a low power of critical point of −0.50 D.

In the contact lens according to the 21st example, the values of the parameters of POWC, PPmax, DiC, DiP, PPH, PPM, PPL, PCP1, PCP2, PCP3, PCP4, PCP5 and PCP6 and the values of relevant conditions thereof are listed in Table 28, and definitions of the aforementioned parameters can refer to the 1st example.

TABLE 28

| 21st example | |
| --- | --- |
| PowC (D) | 0.00 |
| PPmax (D | 11.00 |
| \|PPmax − POWC\| (D) | 11.00 |
| DiC (mm) | 2.4 |
| DiP (mm) | 8.0 |
| PPH (D) | 7.00, 5.00, 11.00, 1.00 |

TABLE 28-continued

| 21st example | |
| --- | --- |
| PPM (D) | — |
| PPL (D) | −2.00, −0.50 |
| \|PPmax/PPH\| | 1.57, 2.20, 1.00, 11.00 |
| \|PPmax/PPL\| | −5.50, −22 |
| PCP1 (D) | 7.00 |
| PCP2 (D) | 5.00 |
| PCP3 (D) | 11.00 |
| PCP4 (D) | −2.00 |
| PCP5 (D) | 1.00 |
| PCP6 (D) | −0.50 |
| PCP1 − POWC (D) | 7.00 |
| PCP2 − PCP1 (D) | −2.00 |
| PCP3 − PCP2 (D) | 6.00 |
| PCP4 − PCP3 (D) | −13.00 |
| PCP5 − PCP4 (D) | 3.00 |
| PCP6 − PCP5 (D) | −1.50 |
| (PCP2 − PCP1)/(PCP1 − POWC) | −0.29 |

In the contact lens according to the 21st example, a first critical point is CP1, a second critical point is CP2, a third critical point is CP3, a fourth critical point is CP4, a fifth critical point is CP5, and a sixth critical point is CP6. The classes of the aforementioned critical points of the 21st example are listed in Table 29.

TABLE 29

| 21st example | |
| --- | --- |
| CP1 | CH |
| CP2 | CH |
| CP3 | CH |
| CP4 | CL |
| CP5 | CH |
| CP6 | CL |

22nd Example

In the 22nd example, the contact lens includes a central region, an annular region and a peripheral region. The central region includes a central point O of the contact lens. The annular region symmetrically surrounds the central region. The peripheral region symmetrically surrounds the annular region. The peripheral region can include at least one color pattern portion. At least one light blocking ring can be disposed outside the central region. The structure of the contact lens of the 22nd example can refer to FIG. 1. The color pattern portion can refer to FIG. 2A to FIG. 3C. The light blocking ring can refer to FIG. 4 to FIG. 11. The annular region includes two high critical points, a medium critical point and four low critical points. The contact lens of the 22nd example can include a cycloplegic agent according to practical demands.

23rd Example

In the 23rd example, the contact lens includes a central region, an annular region and a peripheral region. The central region includes a central point O of the contact lens. The annular region symmetrically surrounds the central region. The peripheral region symmetrically surrounds the annular region. The peripheral region can include at least one color pattern portion. At least one light blocking ring can be disposed outside the central region. The structure of the contact lens of the 23rd example can refer to FIG. 1. The color pattern portion can refer to FIG. 2A to FIG. 3C. The light blocking ring can refer to FIG. 4 to FIG. 11. The annular region includes four high critical points, three medium critical points and three low critical points. The contact lens of the 23rd example can include a cycloplegic agent according to practical demands.

24th Example

In the 24th example, the contact lens includes a central region, an annular region and a peripheral region. The central region includes a central point O of the contact lens. The annular region symmetrically surrounds the central region. The peripheral region symmetrically surrounds the annular region. The peripheral region can include at least one color pattern portion. At least one light blocking ring can be disposed outside the central region. The structure of the contact lens of the 24th example can refer to FIG. 1. The color pattern portion can refer to FIG. 2A to FIG. 3C. The light blocking ring can refer to FIG. 4 to FIG. 11. The annular region includes three high critical points, a medium critical point and four low critical points. The contact lens of the 24th example can include a cycloplegic agent according to practical demands.

25th Example

In the 25th example, the contact lens includes a central region, an annular region and a peripheral region. The central region includes a central point O of the contact lens. The annular region symmetrically surrounds the central region. The peripheral region symmetrically surrounds the annular region. The peripheral region can include at least one color pattern portion. At least one light blocking ring can be disposed outside the central region. The structure of the contact lens of the 25th example can refer to FIG. 1. The color pattern portion can refer to FIG. 2A to FIG. 3C. The light blocking ring can refer to FIG. 4 to FIG. 11. The annular region includes four high critical points, two medium critical points and four low critical points. The contact lens of the 25th example can include a cycloplegic agent according to practical demands.

26th Example

In the 26th example, the contact lens includes a central region, an annular region and a peripheral region. The central region includes a central point O of the contact lens. The annular region symmetrically surrounds the central region. The peripheral region symmetrically surrounds the annular region. The peripheral region can include at least one color pattern portion. At least one light blocking ring can be disposed outside the central region. The structure of the contact lens of the 26th example can refer to FIG. 1. The color pattern portion can refer to FIG. 2A to FIG. 3C. The light blocking ring can refer to FIG. 4 to FIG. 11. The annular region includes two high critical points and a low critical point. The contact lens of the 26th example can include a cycloplegic agent according to practical demands.

Figure 22:
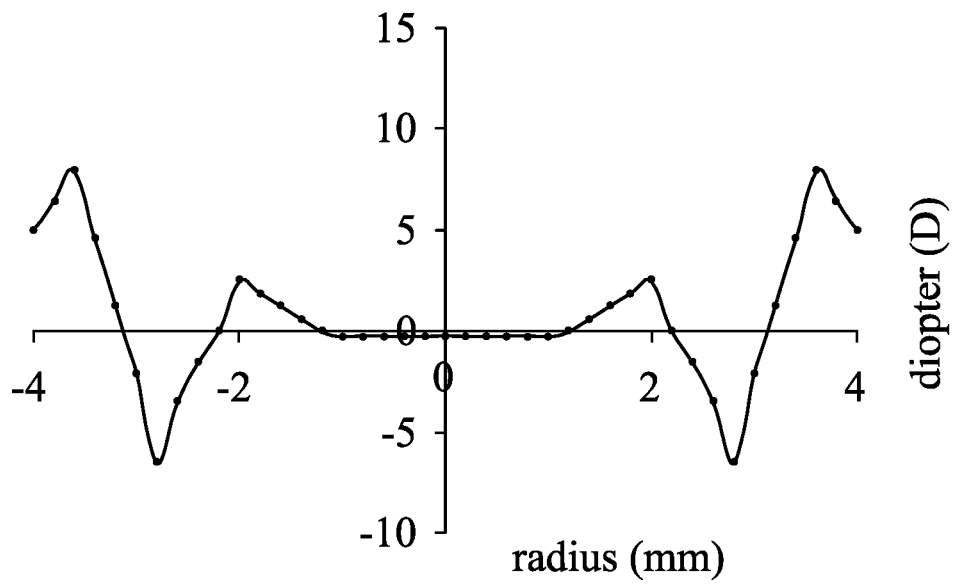
FIG. 22 shows a relationship between a radius and a diopter of a contact lens of the 26th example.

Please refer to Table 30 and FIG. 22 simultaneously. The radius and the correspondent diopter of the contact lens of the 26th example are listed in Table 30. FIG. 22 shows a relationship between the radius and the diopter of the contact lens of the 26th example (the negative radius has an opposite direction with the positive radius).

TABLE 30

| 26th example | |
|---|---|
| radius (mm) | diopter (D) |
| −4.0 | 5.00 |
| −3.8 | 6.50 |
| −3.6 | 8.00 |
| −3.4 | 4.63 |
| −3.2 | 1.25 |
| −3.0 | −2.13 |
| −2.8 | −6.50 |
| −2.6 | −3.50 |
| −2.4 | −1.50 |
| −2.2 | 0 |
| −2.0 | 2.50 |
| −1.8 | 1.88 |
| −1.6 | 1.25 |
| −1.4 | 0.63 |
| −1.2 | 0.00 |
| −1.0 | −0.25 |
| −0.8 | −0.25 |
| −0.6 | −0.25 |
| −0.4 | −0.25 |
| −0.2 | −0.25 |
| 0.0 | −0.25 |
| 0.2 | −0.25 |
| 0.4 | −0.25 |
| 0.6 | −0.25 |
| 0.8 | −0.25 |
| 1.0 | −0.25 |
| 1.2 | 0.00 |
| 1.4 | 0.63 |
| 1.6 | 1.25 |
| 1.8 | 1.88 |
| 2.0 | 2.50 |
| 2.2 | 0 |
| 2.4 | −1.50 |
| 2.6 | −3.50 |
| 2.8 | −6.50 |
| 3.0 | −2.13 |
| 3.2 | 1.25 |
| 3.4 | 4.63 |
| 3.6 | 8.00 |
| 3.8 | 6.50 |
| 4.0 | 5.00 |

Note:
the region with an absolute value of the radius smaller than or equal to 1.0 mm is the central region, and the region with the absolute value of the radius greater than 1.0 mm is the annular region.
Note:
the annular region includes, in order from the central point to a periphery, a high power of critical point of 2.50 D, a low power of critical point of −6.50 D, and a high power of critical point of 8.00 D.

In the contact lens according to the 26th example, the values of the parameters of POWC, PPmax, DiC, DiP, PPH, PPM, PPL, PCP1, PCP2, PCP3, PCP4, PCP5 and PCP6 and the values of relevant conditions thereof are listed in Table 31, and definitions of the aforementioned parameters can refer to the 1st example.

TABLE 31

| 26th example | |
|---|---|
| PowC (D) | −0.25 |
| PPmax (D | 8.00 |
| \|PPmax − POWC\| (D) | 8.25 |
| DiC (mm) | 2 |
| DiP (mm) | 8.0 |
| PPH (D) | 2.50, 8.00 |
| PPM (D) | — |
| PPL (D) | −6.50 |
| \|PPmax/PPH\| | 3.2, 1.0 |
| \|PPmax/PPL\| | −1.23 |
| PCP1 (D) | 2.50 |
| PCP2 (D) | −6.50 |
| PCP3 (D) | 8.00 |
| PCP4 (D) | — |

TABLE 31-continued

| 26th example | |
|---|---|
| PCP5 (D) | — |
| PCP6 (D) | — |
| PCP1 − POWC (D) | 2.75 |
| PCP2 − PCP1 (D) | −9.00 |
| PCP3 − PCP2 (D) | 14.50 |
| PCP4 − PCP3 (D) | — |
| PCP5 − PCP4 (D) | — |
| PCP6 − PCP5 (D) | — |
| (PCP2 − PCP1)/(PCP1 − POWC) | −3.27 |

In the contact lens according to the 26th example, a first critical point is CP1, a second critical point is CP2, a third critical point is CP3, a fourth critical point is CP4, a fifth critical point is CP5, and a sixth critical point is CP6. The classes of the aforementioned critical points of the 26th example are listed in Table 32.

TABLE 32

| 26th example | |
|---|---|
| CP1 | CH |
| CP2 | CL |
| CP3 | CH |
| CP4 | — |
| CP5 | — |
| CP6 | — |

27th Example

In the 27th example, the contact lens includes a central region, an annular region and a peripheral region. The central region includes a central point O of the contact lens. The annular region symmetrically surrounds the central region. The peripheral region symmetrically surrounds the annular region. The peripheral region can include at least one color pattern portion. At least one light blocking ring can be disposed outside the central region. The structure of the contact lens of the 27th example can refer to FIG. 1. The color pattern portion can refer to FIG. 2A to FIG. 3C. The light blocking ring can refer to FIG. 4 to FIG. 11. The annular region includes two high critical points and a low critical point. The contact lens of the 27th example can include a cycloplegic agent according to practical demands.

Figure 23:
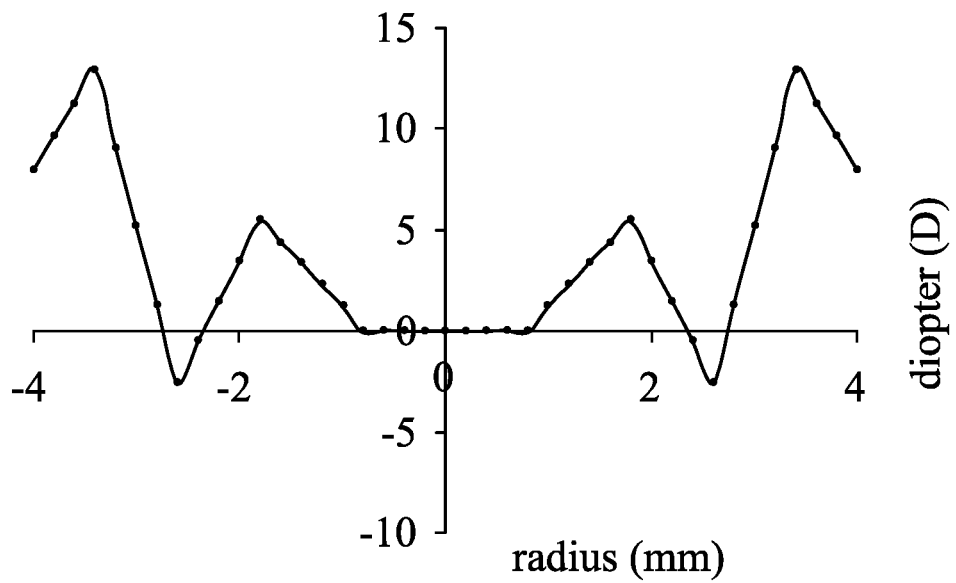
FIG. 23 shows a relationship between a radius and a diopter of a contact lens of the 27th example.

Please refer to Table 33 and FIG. 23 simultaneously. The radius and the correspondent diopter of the contact lens of the 27th example are listed in Table 33. FIG. 23 shows a relationship between the radius and the diopter of the contact lens of the 27th example (the negative radius has an opposite direction with the positive radius).

TABLE 33

| 27th example | |
|---|---|
| radius (mm) | diopter (D) |
| −4.0 | 8.00 |
| −3.8 | 9.67 |
| −3.6 | 11.33 |
| −3.4 | 13.00 |
| −3.2 | 9.13 |
| −3.0 | 5.25 |
| −2.8 | 1.38 |
| −2.6 | −2.50 |
| −2.4 | −0.50 |
| −2.2 | 1.50 |

TABLE 33-continued

27th example

| radius (mm) | diopter (D) |
|---|---|
| −2.0 | 3.50 |
| −1.8 | 5.50 |
| −1.6 | 4.45 |
| −1.4 | 3.40 |
| −1.2 | 2.35 |
| −1.0 | 1.30 |
| −0.8 | 0.00 |
| −0.6 | 0.00 |
| −0.4 | 0.00 |
| −0.2 | 0.00 |
| 0.0 | 0.00 |
| 0.2 | 0.00 |
| 0.4 | 0.00 |
| 0.6 | 0.00 |
| 0.8 | 0.00 |
| 1.0 | 1.30 |
| 1.2 | 2.35 |
| 1.4 | 3.40 |
| 1.6 | 4.45 |
| 1.8 | 5.50 |
| 2.0 | 3.50 |
| 2.2 | 1.50 |
| 2.4 | −0.50 |
| 2.6 | −2.50 |
| 2.8 | 1.38 |
| 3.0 | 5.25 |
| 3.2 | 9.13 |
| 3.4 | 13.00 |
| 3.6 | 11.33 |
| 3.8 | 9.67 |
| 4.0 | 8.00 |

Note:
the region with an absolute value of the radius smaller than or equal to 0.8 mm is the central region, and the region with the absolute value of the radius greater than 0.8 mm is the annular region.
Note:
the annular region includes, in order from the central point to a periphery, a high power of critical point of 5.50 D, a low power of critical point of −2.50 D, and a high power of critical point of 13.00 D.

In the contact lens according to the 27th example, the values of the parameters of POWC, PPmax, DiC, DiP, PPH, PPM, PPL, PCP1, PCP2, PCP3, PCP4, PCP5 and PCP6 and the values of relevant conditions thereof are listed in Table 34, and definitions of the aforementioned parameters can refer to the 1st example.

TABLE 34

27th example

| PowC (D) | 0.00 |
|---|---|
| PPmax (D) | 13.00 |
| |PPmax − POWC| (D) | 13.00 |
| DiC (mm) | 1.6 |
| DiP (mm) | 8.0 |
| PPH (D) | 5.50, 13.00 |
| PPM (D) | — |
| PPL (D) | −2.50 |
| |PPmax/PPH| | 2.36, 1.00 |
| |PPmax/PPL| | −5.2 |
| PCP1 (D) | 5.50 |
| PCP2 (D) | −2.50 |
| PCP3 (D) | 13.00 |
| PCP4 (D) | — |
| PCP5 (D) | — |
| PCP6 (D) | — |
| PCP1 − POWC (D) | 5.50 |
| PCP2 − PCP1 (D) | −8.00 |
| PCP3 − PCP2 (D) | 15.50 |
| PCP4 − PCP3 (D) | — |
| PCP5 − PCP4 (D) | — |
| PCP6 − PCP5 (D) | — |
| (PCP2 − PCP1)/(PCP1 − POWC) | −1.45 |

In the contact lens according to the 27th example, a first critical point is CP1, a second critical point is CP2, a third critical point is CP3, a fourth critical point is CP4, a fifth critical point is CP5, and a sixth critical point is CP6. The classes of the aforementioned critical points of the 27th example are listed in Table 35.

TABLE 35

27th example

| CP1 | CH |
|---|---|
| CP2 | CL |
| CP3 | CH |
| CP4 | — |
| CP5 | — |
| CP6 | — |

28th Example

In the 28th example, the contact lens includes a central region, an annular region and a peripheral region. The central region includes a central point O of the contact lens. The annular region symmetrically surrounds the central region. The peripheral region symmetrically surrounds the annular region. The peripheral region can include at least one color pattern portion. At least one light blocking ring can be disposed outside the central region. The structure of the contact lens of the 28th example can refer to FIG. 1. The color pattern portion can refer to FIG. 2A to FIG. 3C. The light blocking ring can refer to FIG. 4 to FIG. 11. The annular region includes two high critical points and a low critical point. The contact lens of the 28th example can include a cycloplegic agent according to practical demands.

Figure 24:
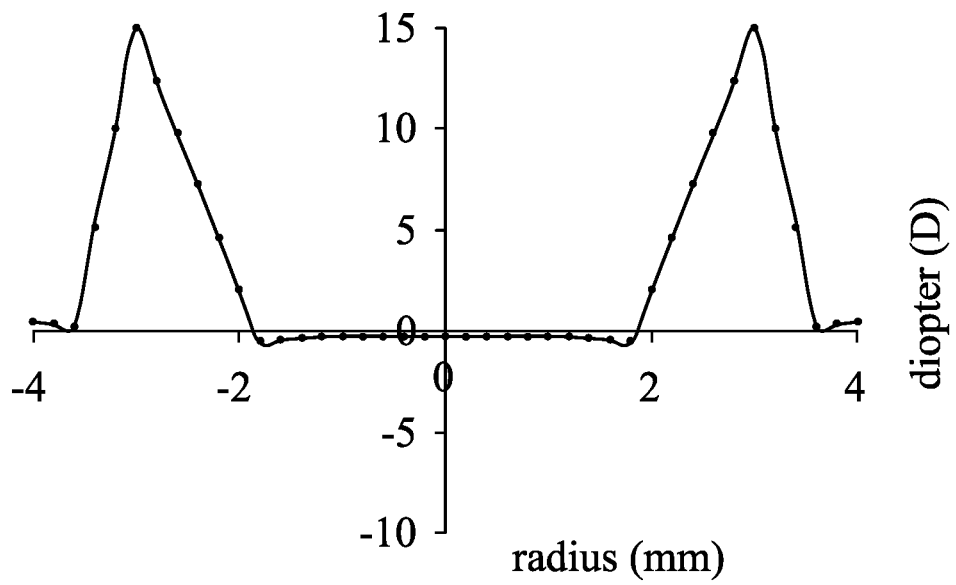
FIG. 24 shows a relationship between a radius and a diopter of a contact lens of the 28th example.

Please refer to Table 36 and FIG. 24 simultaneously. The radius and the correspondent diopter of the contact lens of the 28th example are listed in Table 36. FIG. 24 shows a relationship between the radius and the diopter of the contact lens of the 28th example (the negative radius has an opposite direction with the positive radius).

TABLE 36

28th example

| radius (mm) | diopter (D) |
|---|---|
| −4.0 | 0.50 |
| −3.8 | 0.38 |
| −3.6 | 0.25 |
| −3.4 | 5.17 |
| −3.2 | 10.08 |
| −3.0 | 15.00 |
| −2.8 | 12.42 |
| −2.6 | 9.83 |
| −2.4 | 7.25 |
| −2.2 | 4.67 |
| −2.0 | 2.08 |
| −1.8 | −0.50 |
| −1.6 | −0.42 |
| −1.4 | −0.33 |
| −1.2 | −0.25 |
| −1.0 | −0.25 |
| −0.8 | −0.25 |
| −0.6 | −0.25 |
| −0.4 | −0.25 |
| −0.2 | −0.25 |
| 0.0 | −0.25 |
| 0.2 | −0.25 |
| 0.4 | −0.25 |
| 0.6 | −0.25 |
| 0.8 | −0.25 |

TABLE 36-continued

28th example

| radius (mm) | diopter (D) |
| --- | --- |
| 1.0 | −0.25 |
| 1.2 | −0.25 |
| 1.4 | −0.33 |
| 1.6 | −0.42 |
| 1.8 | −0.50 |
| 2.0 | 2.08 |
| 2.2 | 4.67 |
| 2.4 | 7.25 |
| 2.6 | 9.83 |
| 2.8 | 12.42 |
| 3.0 | 15.00 |
| 3.2 | 10.08 |
| 3.4 | 5.17 |
| 3.6 | 0.25 |
| 3.8 | 0.38 |
| 4.0 | 0.50 |

Note:
the region with an absolute value of the radius smaller than or equal to 1.2 mm is the central region, and the region with the absolute value of the radius greater than 1.2 mm is the annular region.

Note:
the annular region includes, in order from the central point to a periphery, a low power of critical point of −0.50 D, a high power of critical point of 15.00 D, and a high power of critical point of 0.25 D.

In the contact lens according to the 28th example, the values of the parameters of POWC, PPmax, DiC, DiP, PPH, PPM, PPL, PCP1, PCP2, PCP3, PCP4, PCP5 and PCP6 and the values of relevant conditions thereof are listed in Table 37, and definitions of the aforementioned parameters can refer to the 1st example.

TABLE 37

28th example

| | |
| --- | --- |
| PowC (D) | −0.25 |
| PPmax (D | 15.00 |
| \|PPmax − POWC\| (D) | 15.25 |
| DiC (mm) | 2.4 |
| DiP (mm) | 8.0 |
| PPH (D) | 15.00, 0.25 |
| PPM (D) | — |
| PPL (D) | −0.50 |
| \|PPmax/PPH\| | 1.00, 60.00 |
| \|PPmax/PPL\| | −30 |
| PCP1 (D) | −0.50 |
| PCP2 (D) | 15.00 |
| PCP3 (D) | 0.25 |
| PCP4 (D) | — |
| PCP5 (D) | — |
| PCP6 (D) | — |
| PCP1 − POWC (D) | −0.25 |
| PCP2 − PCP1 (D) | 15.50 |
| PCP3 − PCP2 (D) | −14.75 |
| PCP4 − PCP3 (D) | — |
| PCP5 − PCP4 (D) | — |
| PCP6 − PCP5 (D) | — |
| (PCP2 − PCP1)/(PCP1 − POWC) | −62.00 |

In the contact lens according to the 28th example, a first critical point is CP1, a second critical point is CP2, a third critical point is CP3, a fourth critical point is CP4, a fifth critical point is CP5, and a sixth critical point is CP6. The classes of the aforementioned critical points of the 28th example are listed in Table 38.

TABLE 38

28th example

| | |
| --- | --- |
| CP1 | CL |
| CP2 | CH |
| CP3 | CH |
| CP4 | — |
| CP5 | — |
| CP6 | — |

29th Example

In the 29th example, the contact lens includes a central region, an annular region and a peripheral region. The central region includes a central point O of the contact lens. The annular region symmetrically surrounds the central region. The peripheral region symmetrically surrounds the annular region. The peripheral region can include at least one color pattern portion. At least one light blocking ring can be disposed outside the central region. The structure of the contact lens of the 29th example can refer to FIG. 1. The color pattern portion can refer to FIG. 2A to FIG. 3C. The light blocking ring can refer to FIG. 4 to FIG. 11. The annular region includes two high critical points and a low critical point. The contact lens of the 29th example can include a cycloplegic agent according to practical demands.

Figure 25:
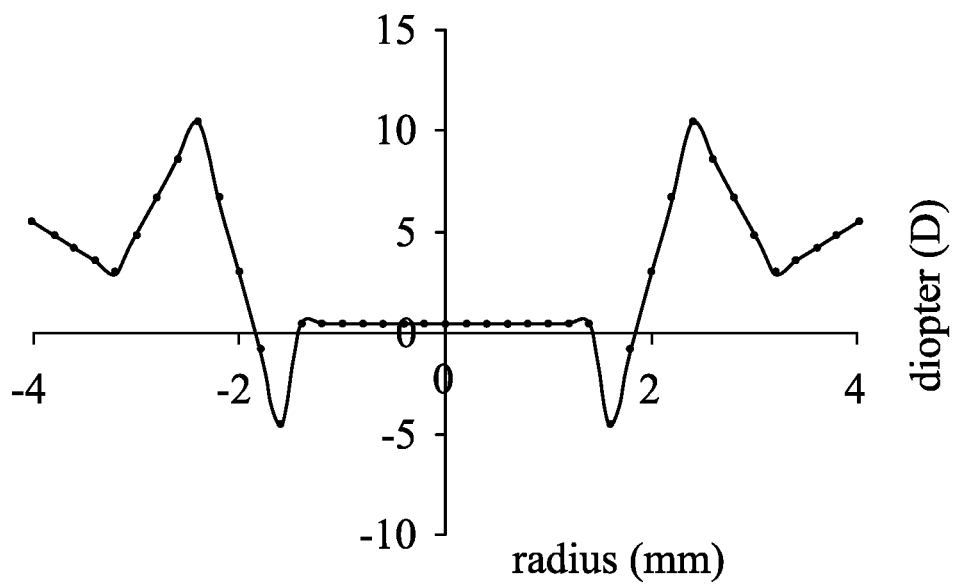
FIG. 25 shows a relationship between a radius and a diopter of a contact lens of the 29th example.

Please refer to Table 39 and FIG. 25 simultaneously. The radius and the correspondent diopter of the contact lens of the 29th example are listed in Table 39. FIG. 25 shows a relationship between the radius and the diopter of the contact lens of the 29th example (the negative radius has an opposite direction with the positive radius).

TABLE 39

29th example

| radius (mm) | diopter (D) |
| --- | --- |
| −4.0 | 5.50 |
| −3.8 | 4.88 |
| −3.6 | 4.25 |
| −3.4 | 3.63 |
| −3.2 | 3.00 |
| −3.0 | 4.88 |
| −2.8 | 6.75 |
| −2.6 | 8.63 |
| −2.4 | 10.50 |
| −2.2 | 6.75 |
| −2.0 | 3.00 |
| −1.8 | −0.75 |
| −1.6 | −4.50 |
| −1.4 | 0.50 |
| −1.2 | 0.50 |
| −1.0 | 0.50 |
| −0.8 | 0.50 |
| −0.6 | 0.50 |
| −0.4 | 0.50 |
| −0.2 | 0.50 |
| 0.0 | 0.50 |
| 0.2 | 0.50 |
| 0.4 | 0.50 |
| 0.6 | 0.50 |
| 0.8 | 0.50 |
| 1.0 | 0.50 |
| 1.2 | 0.50 |
| 1.4 | 0.50 |
| 1.6 | −4.50 |
| 1.8 | −0.75 |
| 2.0 | 3.00 |
| 2.2 | 6.75 |
| 2.4 | 10.50 |
| 2.6 | 8.63 |

TABLE 39-continued

| 29th example | |
|---|---|
| radius (mm) | diopter (D) |
| 2.8 | 6.75 |
| 3.0 | 4.88 |
| 3.2 | 3.00 |
| 3.4 | 3.63 |
| 3.6 | 4.25 |
| 3.8 | 4.88 |
| 4.0 | 5.50 |

Note:
the region with an absolute value of the radius smaller than or equal to 1.4 mm is the central region, and the region with the absolute value of the radius greater than 1.4 mm is the annular region.

Note:
the annular region includes, in order from the central point to a periphery, a low power of critical point of −4.50 D, a high power of critical point of 10.50 D, and a high power of critical point of 3.00 D.

In the contact lens according to the 29th example, the values of the parameters of POWC, PPmax, DiC, DiP, PPH, PPM, PPL, PCP1, PCP2, PCP3, PCP4, PCP5 and PCP6 and the values of relevant conditions thereof are listed in Table 40, and definitions of the aforementioned parameters can refer to the 1st example.

TABLE 40

| 29th example | |
|---|---|
| PowC (D) | 0.50 |
| PPmax (D | 10.50 |
| |PPmax − POWC| (D) | 10.00 |
| DiC (mm) | 2.8 |
| DiP (mm) | 8.0 |
| PPH (D) | 10.50, 3.00 |
| PPM (D) | — |
| PPL (D) | −4.50 |
| |PPmax/PPH| | 1.00, 3.50 |
| |PPmax/PPL| | −2.33 |
| PCP1 (D) | −4.50 |
| PCP2 (D) | 10.50 |
| PCP3 (D) | 3.00 |
| PCP4 (D) | — |
| PCP5 (D) | — |
| PCP6 (D) | — |
| PCP1 − POWC (D) | −5.00 |
| PCP2 − PCP1 (D) | 15.00 |
| PCP3 − PCP2 (D) | −7.50 |
| PCP4 − PCP3 (D) | — |
| PCP5 − PCP4 (D) | — |
| PCP6 − PCP5 (D) | — |
| (PCP2 − PCP1)/(PCP1 − POWC) | −3.00 |

In the contact lens according to the 29th example, a first critical point is CP1, a second critical point is CP2, a third critical point is CP3, a fourth critical point is CP4, a fifth critical point is CP5, and a sixth critical point is CP6. The classes of the aforementioned critical points of the 29th example are listed in Table 41.

TABLE 41

| 29th example | |
|---|---|
| CP1 | CL |
| CP2 | CH |
| CP3 | CH |
| CP4 | — |
| CP5 | — |
| CP6 | — |

30th Example

In the 30th example, the contact lens includes a central region, an annular region and a peripheral region. The central region includes a central point O of the contact lens. The annular region symmetrically surrounds the central region. The peripheral region symmetrically surrounds the annular region. The peripheral region can include at least one color pattern portion. At least one light blocking ring can be disposed outside the central region. The structure of the contact lens of the 30th example can refer to FIG. 1. The color pattern portion can refer to FIG. 2A to FIG. 3C. The light blocking ring can refer to FIG. 4 to FIG. 11. The annular region includes two high critical points and a medium critical point. The contact lens of the 30th example can include a cycloplegic agent according to practical demands.

Figure 26:
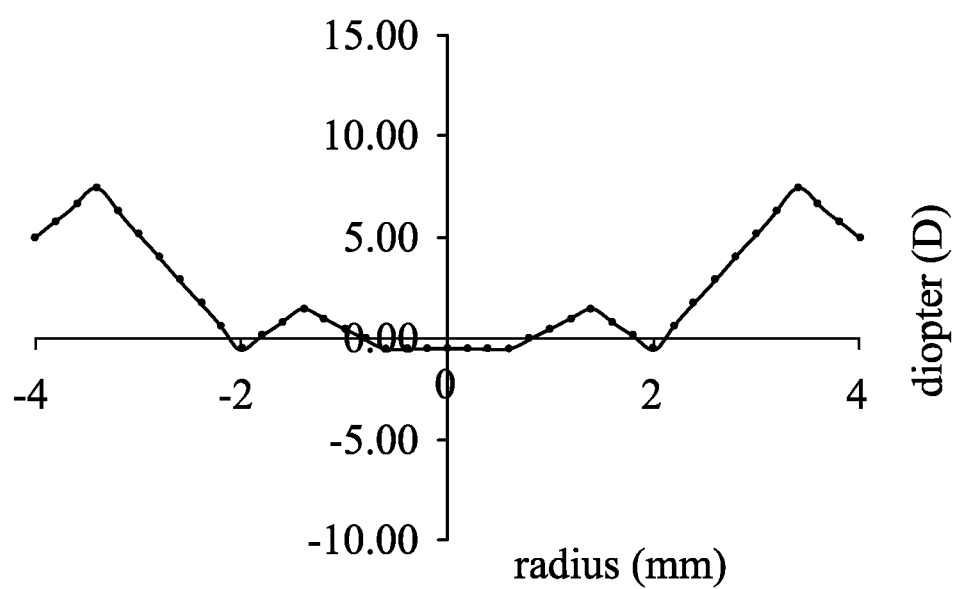
FIG. 26 shows a relationship between a radius and a diopter of a contact lens of the 30th example.

Please refer to Table 42 and FIG. 26 simultaneously. The radius and the correspondent diopter of the contact lens of the 30th example are listed in Table 42. FIG. 26 shows a relationship between the radius and the diopter of the contact lens of the 30th example (the negative radius has an opposite direction with the positive radius).

TABLE 42

| 30th example | |
|---|---|
| radius (mm) | diopter (D) |
| −4.0 | 5.00 |
| −3.8 | 5.83 |
| −3.6 | 6.67 |
| −3.4 | 7.50 |
| −3.2 | 6.36 |
| −3.0 | 5.21 |
| −2.8 | 4.07 |
| −2.6 | 2.93 |
| −2.4 | 1.79 |
| −2.2 | 0.64 |
| −2.0 | −0.50 |
| −1.8 | 0.17 |
| −1.6 | 0.83 |
| −1.4 | 1.50 |
| −1.2 | 1.00 |
| −1.0 | 0.50 |
| −0.8 | 0.00 |
| −0.6 | −0.50 |
| −0.4 | −0.50 |
| −0.2 | −0.50 |
| 0.0 | −0.50 |
| 0.2 | −0.50 |
| 0.4 | −0.50 |
| 0.6 | −0.50 |
| 0.8 | 0.00 |
| 1.0 | 0.50 |
| 1.2 | 1.00 |
| 1.4 | 1.50 |
| 1.6 | 0.83 |
| 1.8 | 0.17 |
| 2.0 | −0.50 |
| 2.2 | 0.64 |
| 2.4 | 1.79 |
| 2.6 | 2.93 |
| 2.8 | 4.07 |
| 3.0 | 5.21 |
| 3.2 | 6.36 |
| 3.4 | 7.50 |
| 3.6 | 6.67 |

TABLE 42-continued

30th example

| radius (mm) | diopter (D) |
|---|---|
| 3.8 | 5.83 |
| 4.0 | 5.00 |

Note:
the region with an absolute value of the radius smaller than or equal to 0.6 mm is the central region, and the region with the absolute value of the radius greater than 0.6 mm is the annular region.

Note:
the annular region includes, in order from the central point to a periphery, a high power of critical point of 1.50 D, a medium power of critical point of −0.50 D, and a high power of critical point of 7.50 D.

In the contact lens according to the 30th example, the values of the parameters of POWC, PPmax, DiC, DiP, PPH, PPM, PPL, PCP1, PCP2, PCP3, PCP4, PCP5 and PCP6 and the values of relevant conditions thereof are listed in Table 43, and definitions of the aforementioned parameters can refer to the 1st example.

TABLE 43

| 30th example | |
|---|---|
| PowC (D) | −0.50 |
| PPmax (D | 7.50 |
| |PPmax − POWC| (D) | 8.00 |
| DiC (mm) | 1.2 |
| DiP (mm) | 8.0 |
| PPH (D) | 1.50, 7.50 |
| PPM (D) | −0.50 |
| PPL (D) | — |
| |PPmax/PPH| | 5.00, 1.00 |
| |PPmax/PPL| | — |
| PCP1 (D) | 1.50 |
| PCP2 (D) | −0.50 |
| PCP3 (D) | 7.50 |
| PCP4 (D) | — |
| PCP5 (D) | — |
| PCP6 (D) | — |
| PCP1 − POWC (D) | 2.00 |
| PCP2 − PCP1 (D) | −2.00 |
| PCP3 − PCP2 (D) | 8.00 |
| PCP4 − PCP3 (D) | — |
| PCP5 − PCP4 (D) | — |
| PCP6 − PCP5 (D) | — |
| (PCP2 − PCP1)/(PCP1 − POWC) | −1.00 |

In the contact lens according to the 30th example, a first critical point is CP1, a second critical point is CP2, a third critical point is CP3, a fourth critical point is CP4, a fifth critical point is CP5, and a sixth critical point is CP6. The classes of the aforementioned critical points of the 30th example are listed in Table 44.

TABLE 44

| 30th example | |
|---|---|
| C P 1 | CH |
| C P 2 | CM |
| C P 3 | CH |
| C P 4 | — |
| C P 5 | — |
| C P 6 | — |

According to the aforementioned examples, with the contact lens according to present disclosure including at least one critical point, the defocus degree can be enhanced by stage and the defocus degree can be moderated gradually, which can effectively moderate the increase degree of the diopter away from the central region, so that the wear comfort can be enhanced, and the possibility of long term treatment can be enhanced.

According to the contact lens of the present disclosure, the central region can provide a clear focusing function for the central vision of the wearer. Also, the diopter of the central region can be less than the myopia diopter of the wearer by 0.25 D to 0.5 D for easing the wear discomfort. The central region includes the central point of the contact lens, and the diopter thereof is constant.

According to the contact lens of the present disclosure, the annular region can prevent myopia or control myopia. A maximum diameter of the annular region can be 8 mm. The annular region can be disposed with at least one light blocking ring or color pattern portion (which is extended from the peripheral region to the annular region).

According to the contact lens of the present disclosure, the peripheral region can enable the contact lens to attach to the eye ball and provides a support function. The peripheral region can be disposed with at least one color pattern portion or at least one light blocking ring (which is extended from the annular region to the peripheral region). The peripheral region is an annular area where a diameter thereof is greater than 8 mm.

According to the contact lens of the present disclosure, the color pattern portion is mainly disposed at the peripheral region and can be extended to the annular region (i.e., only a partial of the color pattern portion is located at the annular region). A pattern of the color pattern portion is usually irregular. The pattern of the color pattern portion can be, but is not limited to, a radial shape, a petal shape or an annular shape. Each of the color pattern portion has a color, and the color can be selected from red, orange, yellow, green, blue, indigo, purple, black, white, silver or gold. When the color of the color pattern portion is black, a maximum outer diameter thereof is greater than 12.0 mm. When the contact lens is divided into four quadrants of A, B, C and D, each of the quadrant is bounded by a horizontal axis and a vertical axis, and the central point of the contact lens is the center of the four quadrants, at least two quadrants can have repeated patterns so as to form symmetry, which allows different quadrants to have an identical effect for reducing stray light. When there are more repeated patterns in the four quadrants, the consistency of reducing stray light can be enhanced. The pattern of the color pattern portion can be designed with identification function for observe side and reverse side, which can provide the wearer with the function of wearing correctness.

According to the contact lens of the present disclosure, the light blocking ring is disposed at the area outside the central region. Specifically, the light blocking ring is mainly disposed at the annular region and can be extended to the peripheral region (i.e., only a partial of the light blocking ring is located at the peripheral region). The light blocking ring is usually an evenly distributed arrangement, and can be in monochrome, a dotted distribution, a single ring, multiple rings, etc. A color of the light blocking ring can be selected from red, orange, yellow, green, blue, indigo, purple, black, white, silver or gold.

According to the contact lens of the present disclosure, a minimum average transmittance for visible light of the light blocking ring can be less than 50%. Alternatively, the minimum average transmittance for visible light of the light blocking ring can be less than 40%. Alternatively, the minimum average transmittance for visible light of the light blocking ring can be less than 30%. Alternatively, the minimum average transmittance for visible light of the light blocking ring can be less than 15%. The average transmittance for visible light can be measured as follows. Select any point of the light blocking ring as the measured point for measuring the average transmittance for visible light (wavelength range is 400 nm to 700 nm). The minimum of the average transmittances for visible light of the points of the light blocking ring can be regarded as the minimum average transmittance for visible light of the light blocking ring. In general, a minimum average transmittance for visible light of a black light blocking ring can be less than 10%, and a minimum average transmittance for visible light of a semi-transparent light blocking ring can be less than 50%.

According to the contact lens of the present disclosure, a critical point is a point where a slope of tangent line equals to 0 in the diagram which shows a relationship between a radius and a diopter of the contact lens. In other words, the tangent line of the critical point is perpendicular to the Y axis (which represents the D value), and the two points, located at both sides of the critical point, which are closest to the critical point have the D values simultaneously greater than or simultaneously less than the power of critical point. The number of the critical points are decided as follows. Select any radius line segment which starts from the central point of the contact lens and ends to a periphery of the contact lens. Draw a diagram which shows a relationship between a radius and a diopter of the radius line segment, then count the number of the critical points in the annular region on the radius line segment. The critical points may include high critical points, medium critical points and low critical points. Moreover, the critical points with an identical D value are only counted once.

According to the contact lens of the present disclosure, the D value refers to the power of diopter.

According to the contact lens of the present disclosure, the names of the critical points are decided according to the order from a center (i.e., the central point) to a periphery of the contact lens, wherein a critical point closest to the center is a first critical point (also can be named as Critical Point 1, CP1), and the rest critical points towards the periphery are a second critical point, a third critical point, and so on.

According to the contact lens of the present disclosure, a power of a first critical point (also can be named as Power of Critical Point 1, PCP1) is the diopter of the first critical point, a power of a second critical point (also can be named as Power of Critical Point 2, PCP2) is the diopter of the second critical point, and so on.

According to the contact lens of the present disclosure, the contact lens can be transparent, and an average transmittance for visible light thereof is greater than 92%. Alternatively, the contact lens can be added with a blue dye, and an average transmittance for visible light thereof is greater than 83%. Alternatively, the contact lens can be added with a UV absorber, and an average transmittance for visible light thereof is greater than 91%. Alternatively, the contact lens can be added with a blue blocker, and an average transmittance for visible light thereof is greater than 75%.

According to the present disclosure, the cycloplegic agent can include but is not limited to atropine ((3-endo)-8-methyl-8-azabicyclo[3.2.1]oct-3-yl tropate), tropicamide (N-ethyl-3-hydroxy-2-phenyl-N-(4-pyridinylmethyl)propanamide), cyclopentolate (2-(dimethylamino)ethyl (1-hydroxycyclopentyl)(phenyl)acetate), homatropine ((3-endo)-8-methyl-8-azabicyclo[3.2.1]oct-3-yl hydroxy(phenyl)acetate), scopolamine ((1R,2R,4S,5S,7S)-9-methyl-3-oxa-9-azatricyclo[3.3.1.0$^2$]non-7-yl(2S)-3-hydroxy-2-phenylpropanoate), eucatropine (1,2,2,6-tetramethyl-4-piperidinyl hydroxy(phenyl)acetate) or the salt thereof. The cycloplegic agent, also known as a mydriatic agent, belongs to a parasympathetic blocker, i.e., a non-selective m-type muscarinic receptor blocker, which can control the paralysis and relaxation of the ciliary muscle of pupils by blocking the muscarinic receptor so as to enlarge the pupil.

Although the present disclosure has been described in considerable detail with reference to certain embodiments thereof, other embodiments are possible. Therefore, their spirit and scope of the appended claims should no be limited to the description of the embodiments container herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A contact lens, comprising:
   a central region comprising a central point of the contact lens;
   an annular region symmetrically surrounding the central region; and
   a peripheral region symmetrically surrounding the annular region;
   wherein the peripheral region comprises at least one color pattern portion, the annular region comprises at least one low power of critical point, a diopter of the central region is POWC, a maximum diopter of the annular region is PPmax, and the following conditions are satisfied:

$-0.50D \leq POWC \leq 0.50D$; and $2.00D \leq |PPmax - POWC| \leq 20.00D$.

2. The contact lens of claim 1, wherein the maximum diopter of the annular region is PPmax, and the following condition is satisfied:

$0D \leq PPmax \leq 15.00D$.

3. The contact lens of claim 1, wherein the annular region comprises at least one high power of critical point, the high power of critical point is PPH, and the following condition is satisfied:

$-5.00 \leq D \leq PPH \leq 20.00D$.

4. The contact lens of claim 1, wherein the annular region comprises at least one low power of critical point, the low power of critical point is PPL, and the following condition is satisfied:

$-10.00D \leq PPL \leq 0D$.

5. The contact lens of claim 1, wherein the annular region comprises at least one high power of critical point, the maximum diopter of the annular region is PPmax, the high power of critical point is PPH, and the following condition is satisfied:

$5.00 \leq PPmax/PPH \leq 20.00$.

6. The contact lens of claim 1, wherein the annular region comprises at least one low power of critical point, the maximum diopter of the annular region is PPmax, the low power of critical point is PPL, and the following condition is satisfied:

$30.00 \leq PPmax/PPL \leq 0$.

7. The contact lens of claim 1, wherein a maximum diameter of the central region is DiC, and the following condition is satisfied:

$1.0\ mm \leq DiC \leq 4.5\ mm.$

8. The contact lens of claim 1, wherein the diopter of the central region is POWC, the maximum diopter of the annular region is PPmax, and the following condition is satisfied:

$2.00D \leq |PPmax-POWC| 8.00D.$

9. The contact lens of claim 1, wherein the peripheral region comprises at least two color pattern portions, the two color pattern portions are a first color pattern portion and a second color pattern portion, a color of the first color pattern portion is selected from red, orange, yellow, green, blue, indigo, purple, black, white, silver or gold, and a color of the second color pattern portion is different from the color of the first color pattern portion.

10. The contact lens of claim 1, wherein the peripheral region comprises at least one light blocking ring, a pattern of the light blocking ring is solidly filled, discontinuously filled or is a dotted distribution.

11. A contact lens, comprising:
a central region comprising a central point of the contact lens;
an annular region symmetrically surrounding the central region; and
a peripheral region symmetrically surrounding the annular region;
wherein the peripheral region comprises at least one color pattern portion, the annular region comprises at least one low power of critical point, a diopter of the central region is POWC, a maximum diopter of the annular region is PPmax, and the following condition is satisfied:

$2.00D \leq |PPmax-POWC| \leq 20.00D.$

12. The contact lens of claim 11, wherein the diopter of the central region is POWC, and the following condition is satisfied:

$-7.00D \leq POWC \leq -0.25D.$

13. The contact lens of claim 11, wherein the peripheral region comprises at least two color pattern portions, the two color pattern portions are a first color pattern portion and a second color pattern portion, a color of the first color pattern portion is selected from red, orange, yellow, green, blue, indigo, purple, black, white, silver or gold, and a color of the second color pattern portion is different from the color of the first color pattern portion.

14. The contact lens of claim 11, wherein the annular region comprises at least one high power of critical point, the maximum diopter of the annular region is PPmax, the high power of critical point is PPH, and the following condition is satisfied:

$5.00 \leq PPmax/PPH \leq 20.00.$

15. The contact lens of claim 11, wherein the annular region comprises at least one low power of critical point, the maximum diopter of the annular region is PPmax, the low power of critical point is PPL, and the following condition is satisfied:

$30.00 \leq PPmax/PPL \leq 0.$

16. A contact lens, comprising:
a central region comprising a central point of the contact lens;
an annular region symmetrically surrounding the central region; and
a peripheral region symmetrically surrounding the annular region;
wherein the contact lens further comprises at least one light blocking ring disposed outside the central region, the annular region comprises at least one low power of critical point, a diopter of the central region is POWC, a maximum diopter of the annular region is PPmax, and the following condition is satisfied:

$2.00D \leq |PPmax-POWC| \leq 20.00D.$

17. The contact lens of claim 16, wherein the peripheral region comprises at least one color pattern portion.

18. The contact lens of claim 16, wherein a minimum inner diameter of the light blocking ring is DBi, and the following condition is satisfied:

$3.5\ mm \leq DBi \leq 11.0\ mm.$

19. The contact lens of claim 16, wherein a maximum outer diameter of the light blocking ring is DBo, and the following condition is satisfied:

$6.0\ mm \leq DBo \leq 11.0\ mm.$

20. The contact lens of claim 16, wherein a color of the light blocking ring is selected from red, orange, yellow, green, blue, indigo, purple, black, white, silver or gold.

21. A contact lens, comprising:
a central region comprising a central point of the contact lens;
an annular region symmetrically surrounding the central region; and
a peripheral region symmetrically surrounding the annular region;
wherein the annular region comprises at least two powers of critical points, in order from the central point to a periphery, the two powers of critical points are a power of a first critical point and a power of a second critical point, the power of the first critical point is a high power of critical point, the power of the second critical point is a low power of critical point, a diopter of the central region is POWC, a maximum diopter of the annular region is PPmax, the power of the first critical point is PCP1, a maximum diameter of the central region is DiC, and the following conditions are satisfied:

$00D < |PPmax-POWC| \leq 20.00D;$ $0D < PCP1-POWC \leq 3.80D;$ and $1.0\ mm \leq DiC.$ 22. The contact lens of claim 21, wherein the power of the first critical point is PCP1, the power of the second critical point is PCP2, and the following condition is satisfied:

$-7.00D \leq PCP2-PCP1 \leq 0D.$

23. The contact lens of claim 21, wherein the power of the first critical point is PCP1, the power of the second critical point is PCP2, and the following condition is satisfied:

$-14.00D \leq PCP2-PCP1 \leq -7.50D.$

24. The contact lens of claim 21, wherein the annular region comprises at least three powers of critical points, in order from the central point to the periphery, the three powers of critical points are the power of the first critical point, the power of the second critical point and a power of a third critical point, the power of the second critical point is PCP2, the power of the third critical point is PCP3, and the following condition is satisfied:

$$0D \leq PCP3-PCP2 \leq 12.00D.$$

25. The contact lens of claim 21, wherein the annular region comprises at least three powers of critical points, in order from the central point to the periphery, the three powers of critical points are the power of the first critical point, the power of the second critical point and a power of a third critical point, the power of the second critical point is PCP2, the power of the third critical point is PCP3, and the following condition is satisfied:

$$14.00D \leq PCP3-PCP2 \leq 20.00D.$$

26. The contact lens of claim 21, wherein the diopter of the central region is POWC, the power of the first critical point is PCP1, the power of the second critical point is PCP2, and the following condition is satisfied:

$$-1.75 \leq (PCP2-PCP1)/(PCP1-POWC) \leq 0.$$

27. The contact lens of claim 21, wherein the diopter of the central region is POWC, the power of the first critical point is PCP1, the power of the second critical point is PCP2, and the following condition is satisfied:

$$-25 \leq (PCP2-PCP1)/(PCP1-POWC) \leq -1.9.$$

28. The contact lens of claim 21, wherein the annular region comprises at least three powers of critical points, in order from the central point to the periphery, the three powers of critical points are the power of the first critical point, the power of the second critical point and a power of a third critical point, and the power of the third critical point is a high power of critical point.

29. The contact lens of claim 21, wherein the annular region comprises at least three powers of critical points, in order from the central point to the periphery, the three powers of critical points are the power of the first critical point, the power of the second critical point and a power of a third critical point, and the power of the third critical point is a medium power of critical point.

30. The contact lens of claim 21, wherein the annular region comprises at least three powers of critical points, in order from the central point to the periphery, the three powers of critical points are the power of the first critical point, the power of the second critical point and a power of a third critical point, and the power of the third critical point is a low power of critical point.

31. A contact lens, comprising:
a central region comprising a central point of the contact lens;
an annular region symmetrically surrounding the central region; and
a peripheral region symmetrically surrounding the annular region;
wherein the annular region comprises at least two powers of critical points, in order from the central point to a periphery, the two powers of critical points are a power of a first critical point and a power of a second critical point, the power of the first critical point is a high power of critical point, a diopter of the central region is POWC, a maximum diopter of the annular region is PPmax, the power of the first critical point is PCP1, and the following conditions are satisfied:

$$2.00D \leq |PPmax-POWC| \leq 20.00D; \text{ and}$$

$$4.00D \leq PCP1-POWC \leq 20.00D.$$

32. The contact lens of claim 31, wherein the power of the first critical point is PCP1, the power of the second critical point is PCP2, and the following condition is satisfied:

$$-7.00D \leq PCP2-PCP1 \leq 0D.$$

33. The contact lens of claim 31, wherein the power of the first critical point is PCP1, the power of the second critical point is PCP2, and the following condition is satisfied:

$$-14.00D \leq PCP2-PCP1 \leq -7.50D.$$

34. The contact lens of claim 31, wherein the annular region comprises at least three powers of critical points, in order from the central point to the periphery, the three powers of critical points are the power of the first critical point, the power of the second critical point and a power of a third critical point, the power of the second critical point is PCP2, the power of the third critical point is PCP3, and the following condition is satisfied:

$$0D \leq PCP3-PCP2 \leq 12.00D.$$

35. The contact lens of claim 31, wherein the annular region comprises at least three powers of critical points, in order from the central point to the periphery, the three powers of critical points are the power of the first critical point, the power of the second critical point and a power of a third critical point, the power of the second critical point is PCP2, the power of the third critical point is PCP3, and the following condition is satisfied:

$$14.00D \leq PCP3-PCP2 \leq 20.00D.$$

36. The contact lens of claim 31, wherein the diopter of the central region is POWC, the power of the first critical point is PCP1, the power of the second critical point is PCP2, and the following condition is satisfied:

$$-1.75 \leq (PCP2-PCP1)/(PCP1-POWC) \leq 0.$$

37. The contact lens of claim 31, wherein the diopter of the central region is POWC, the power of the first critical point is PCP1, the power of the second critical point is PCP2, and the following condition is satisfied:

$$-25 \leq (PCP2-PCP1)/(PCP1-POWC) \leq -1.9.$$

38. The contact lens of claim 31, wherein the power of the second critical point is a high power of critical point.

39. The contact lens of claim 31, wherein the power of the second critical point is a medium power of critical point.

40. The contact lens of claim 31, wherein the power of the second critical point is a low power of critical point.

41. A contact lens, comprising:
a central region comprising a central point of the contact lens;
an annular region symmetrically surrounding the central region; and
a peripheral region symmetrically surrounding the annular region;
wherein the annular region comprises at least one power of critical point, a power of critical point closest to the central point is a power of a first critical point, the power of the first critical point is a low power of critical point, a diopter of the central region is POWC, a maximum diopter of the annular region is PPmax, the power of the first critical point is PCP1, and the following conditions are satisfied:

$$2.00D \leq |PPmax-POWC| \leq 20.00D; \text{ and}$$

$$-5.00D \leq PCP1-POWC < 0D.$$

42. The contact lens of claim 41, wherein the annular region comprises at least two powers of critical points, in order from the central point to a periphery, the two powers of critical points are the power of the first critical point and a power of a second critical point, the power of the first critical point is PCP1, the power of the second critical point is PCP2, and the following condition is satisfied:

$-7.00D \leq PCP2-PCP1 \leq 0D.$

43. The contact lens of claim 41, wherein the annular region comprises at least two powers of critical points, in order from the central point to a periphery, the two powers of critical points are the power of the first critical point and a power of a second critical point, the power of the first critical point is PCP1, the power of the second critical point is PCP2, and the following condition is satisfied:

$-14.00D \leq PCP2-PCP1 \leq -7.50D.$

44. The contact lens of claim 41, wherein the annular region comprises at least three powers of critical points, in order from the central point to a periphery, the three powers of critical points are the power of the first critical point, a power of a second critical point and a power of a third critical point, the power of the second critical point is PCP2, the power of the third critical point is PCP3, and the following condition is satisfied:

$0D \leq PCP3-PCP2 \leq 12.00D.$

45. The contact lens of claim 41, wherein the annular region comprises at least three powers of critical points, in order from the central point to a periphery, the three powers of critical points are the power of the first critical point, a power of a second critical point and a power of a third critical point, the power of the second critical point is PCP2, the power of the third critical point is PCP3, and the following condition is satisfied:

$14.00D \leq PCP3-PCP2 \leq 20.00D.$

46. The contact lens of claim 41, wherein the annular region comprises at least two powers of critical points, in order from the central point to a periphery, the two powers of critical points are the power of the first critical point and a power of a second critical point, the diopter of the central region is POWC, the power of the first critical point is PCP1, the power of the second critical point is PCP2, and the following condition is satisfied:

$-1.75 \leq (PCP2-PCP1)/(PCP1-POWC) \leq 0.$

47. The contact lens of claim 41, wherein the annular region comprises at least two powers of critical points, in order from the central point to a periphery, the two powers of critical points are the power of the first critical point and a power of a second critical point, the diopter of the central region is POWC, the power of the first critical point is PCP1, the power of the second critical point is PCP2, and the following condition is satisfied:

$-25 \leq (PCP2-PCP1)/(PCP1-POWC) \leq -1.9.$

48. The contact lens of claim 41, wherein the annular region comprises at least two powers of critical points, in order from the central point to a periphery, the two powers of critical points are the power of the first critical point and a power of a second critical point, and the power of the second critical point is a high power of critical point.

49. The contact lens of claim 41, wherein the annular region comprises at least two powers of critical points, in order from the central point to a periphery, the two powers of critical points are the power of the first critical point and a power of a second critical point, and the power of the second critical point is a medium power of critical point.

50. The contact lens of claim 41, wherein the annular region comprises at least two powers of critical points, in order from the central point to a periphery, the two powers of critical points are the power of the first critical point and a power of a second critical point, and the power of the second critical point is a low power of critical point.

51. A contact lens product, comprising:
the contact lens of claim 1, 11, 16, 21, 31 or 41; and
an immersing solution, wherein the contact lens is immersed in the immersing solution;
wherein at least one of the contact lens and the immersing solution comprises a cycloplegic agent.

* * * * *